United States Patent
Hakeem et al.

(10) Patent No.: US 11,472,991 B2
(45) Date of Patent: Oct. 18, 2022

(54) METHOD OF PRODUCING ALUMINA CERAMICS REINFORCED WITH OIL FLY ASH

(71) Applicant: KING FAHD UNIVERSITY OF PETROLEUM AND MINERALS, Dhahran (SA)

(72) Inventors: Abbas Saeed Hakeem, Dhahran (SA); Akolade Idris Bakare, Dhahran (SA); Muhammad Ali Ehsan, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 641 days.

(21) Appl. No.: 16/527,807

(22) Filed: Jul. 31, 2019

(65) Prior Publication Data
US 2021/0032521 A1  Feb. 4, 2021

(51) Int. Cl.
 *C04B 35/117* (2006.01)
 *C04B 35/64* (2006.01)
 (Continued)

(52) U.S. Cl.
 CPC ............... *C09K 5/14* (2013.01); *C04B 35/117* (2013.01); *C04B 35/62204* (2013.01); *C04B 35/62635* (2013.01); *C04B 35/64* (2013.01); *C04B 7/43* (2013.01); *C04B 7/4453* (2013.01); *C04B 35/622* (2013.01); *C04B 35/62605* (2013.01); *C04B 35/62665* (2013.01); *C04B 35/645* (2013.01); *C04B 40/00* (2013.01); *C04B 40/0021* (2013.01); *C04B 2235/3217* (2013.01);
 (Continued)

(58) Field of Classification Search
 CPC ............. C04B 35/117; C04B 35/62204; C04B 2235/666
 See application file for complete search history.

(56) References Cited

U.S. PATENT DOCUMENTS

2012/0157358 A1*  6/2012  Fang ................... E21B 43/267
                                                           507/269

FOREIGN PATENT DOCUMENTS

CA     2 788 186 C     4/2015
CA     2 812 576 C    12/2015
(Continued)

OTHER PUBLICATIONS

Saheb et al. Processing and characterization of new nanocrystalline Al2O3-fly ash composites. International Journal of Microstructure and Materials Properties, vol. 3, No. 6, 2008, pp. 801-809. (Year: 2008).*

(Continued)

*Primary Examiner* — Erin Snelting
(74) *Attorney, Agent, or Firm* — Oblon, McClelland, Maier & Neustadt, L.L.P.

(57) ABSTRACT

A method for making ceramic composites via sintering a mixture of alumina and oil fly ash. The alumina is in the form of nanoparticles and/or microparticles. The oil fly ash may be treated with an acid prior to the sintering. The composite may comprise graphite carbon derived from oil fly ash dispersed in an alumina matrix. The density, mechanical performance (e.g. Vickers hardness, fracture toughness), and thermal properties (e.g. thermal expansion, thermal conductivity) of the ceramic composites prepared by the method are also specified.

20 Claims, 16 Drawing Sheets

(51) Int. Cl.

| | | |
|---|---|---|
| *C04B 35/622* | (2006.01) | |
| *C04B 35/626* | (2006.01) | |
| *C04B 35/645* | (2006.01) | |
| *C09K 5/14* | (2006.01) | |
| *C04B 7/44* | (2006.01) | |
| *C04B 40/00* | (2006.01) | |
| *C04B 7/43* | (2006.01) | |

(52) U.S. Cl.
CPC .......... *C04B 2235/5436* (2013.01); *C04B 2235/5454* (2013.01); *C04B 2235/6562* (2013.01); *C04B 2235/6567* (2013.01); *C04B 2235/666* (2013.01); *C04B 2235/77* (2013.01); *C04B 2235/9607* (2013.01)

(56) References Cited

FOREIGN PATENT DOCUMENTS

| CN | 104762517 A | 7/2015 |
|---|---|---|
| CN | 108103361 A | 6/2018 |
| KR | 10-0717201 B1 | 5/2007 |

OTHER PUBLICATIONS

Kim et al. Effects of heating rate on microstructure and transparency of spark-plasma-sintered alumina. Journal of the European Ceramic Society 29 (2008) 323-327. (Year: 2008).*

Al-Degs et al. Characterization and utilization of fly ash of heavy fuel oil generated in power stations. Fuel Processing Technology 123 (2014) 41-46. (Year: 2014).*

Eijiro Nakamura, et al., "Fabrication of Composite Materials Using Coal Ash and Aluminum Sludge by Spark Plasma Sintering", Journal of Solid Mechanics and Materials Engineernig, vol. 5, No. 12, 2011, pp. 967-977.

Yasuyuki Kanda, et al., "Mechanical Characteristic of Spark Plasma Sintered Composite Material Using Aluminum Alloy Powders and Fly Ash", J. Jpn. Soc. Powder and Powder Metallurgy, vol. 62, No. 5, 2015, pp. 243-251 (with English-language Translation).

N. Saheb, et al., "Processing and characterisation of new nanocrystalline Al2O3-fly ash composites", International Journal of Microstructure and Materials Properties, vol. 3, Issue 6, Jan. 21, 2009, 2 pages (Abstract only).

R. Q. Guo, et al., "Preparation of aluminum-fly ash particulate composite by powder metallurgy technique", Journal of Materials Science, vol. 32, Issue 15, 1997, pp. 3971-3974.

* cited by examiner

0wt.% OFA

1wt.% OFA

2wt.% OFA

3wt.% OFA

4wt.% OFA

5wt.% OFA

METHOD OF PRODUCING ALUMINA CERAMICS REINFORCED WITH OIL FLY ASH

STATEMENT OF ACKNOWLEDGEMENT

The authors wish to acknowledge the Center of Excellence in Nanotechnology (CENT) at King Fahd University of Petroleum and Minerals (KFUPM), Dhahran, Saudi Arabia, for funding this work through CENT-Internal Project No. NT-2015-02.

BACKGROUND OF THE INVENTION

Technical Field

The present disclosure relates to a method for preparing ceramic composites using alumina particles and oil fly ash via a sintering process.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Scientists have been studying the structure-property relationship of existing ceramics in order to develop novel materials with enhanced performance. Utilization of conventional ceramic materials for building construction and machining applications is limited because of inherent brittleness. For example, ceramic cutting tools should withstand mechanical shock, heat, and chemical attacks [H. M. Irshad, B. A. Ahmed, M. A. Ehsan, T. I. Khan, T. Laoui, M. R. Yousaf, A. Ibrahim, A. S. Hakeem, Investigation of the structural and mechanical properties of micro-/nano-sized $Al_2O_3$ and cBN composites prepared by spark plasma sintering, Ceram. Int. 43 (2017) 10645-106531]. A recent study demonstrated that mechanical and thermal resistance of ceramics could be altered by the addition of second phase materials such as nitrides, carbides, and zirconia fillers [A. Shonhiwa, M. Herrmann, I. Sigalas, N. Coville, Reaction bonded aluminum oxide composites containing cubic boron nitride, Ceram. Int. 35 (2009) 909-911, incorporated herein by reference in its entirety].

Despite these recent advances, there is still need to develop ceramic materials from cheap and readily available resources that have suitable density, hardness and thermal stability. In view of the foregoing, one objective of the present disclosure is to provide a method for making alumina ceramics employing alumina microparticles and/or nanoparticles and oil fly ash collected as a waste from power plants. The alumina ceramics described herein exhibit mechanical and thermal properties that are generally satisfactory.

BRIEF SUMMARY OF THE INVENTION

An aspect of the present disclosure relates to a method of producing a composite including oil fly ash dispersed in an alumina matrix. This method involves mixing oil fly ash and alumina to form a mixture, and sintering the mixture, thereby producing the composite, wherein a weight ratio of the alumina to the oil fly ash is in a range of 9:1 to 500:1, and the sintering involves applying a uniaxial pressure ranging from 30-80 MPa to the mixture.

In one embodiment, the mixing involves sonication.

In one embodiment, the sintering is a spark plasma sintering process.

In one embodiment, the sintering is performed at a temperature ranging from 1,200-1,600° C.

In a further embodiment of the above, the sintering is performed with a holding time ranging from 5-60 minutes.

In one embodiment, the sintering involves heating the mixture at a heating rate ranging from 50-150° C./min.

In one embodiment, the oil fly ash is treated with an acid prior to the mixing.

In one embodiment, the oil fly ash is devoid of nickel, iron, and vanadium.

In one embodiment, the oil fly ash is in the form of porous particles with an average particle size of 5-60 μm.

In a further embodiment of the above, the porous particles are spherical.

In one embodiment, the alumina comprises $\alpha$-$Al_2O_3$.

In one embodiment, the alumina is in the form of particles with an average particle size of 0.005-100 μm.

In a further embodiment of the above, the alumina is in the form of nanoparticles with an average particle size of 10-600 nm.

In another further embodiment of the above, the alumina is in the form of microparticles with an average particle size of 5-50 μm.

In one embodiment, a weight ratio of the alumina to the oil fly ash is in a range of 19:1 to 99:1.

In one embodiment, the composite has a density of 3.5-4.2 g/cm³.

In one embodiment, the composite has a Vickers hardness of 11-23 GPa.

In one embodiment, the composite has a fracture toughness of 3.8-6 MPa×m$^{1/2}$.

In one embodiment, the composite has a coefficient of thermal expansion of 6-7 ppm×K$^{-1}$.

In one embodiment, the composite has a thermal conductivity of 7-30 W/m·K at a temperature ranging from 20-120° C.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1A:
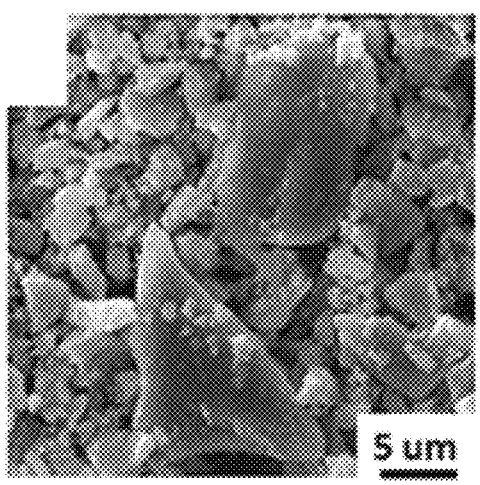
FIG. 1A is a field emission scanning electron microscope (FESEM) micrograph (scale bar: 5 μm) of alumina microparticles.
Figure 1B:
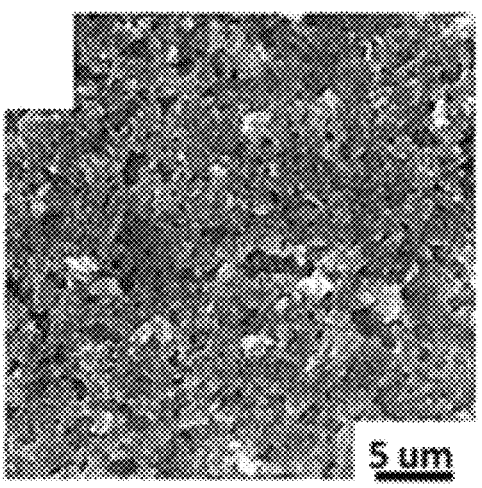
FIG. 1B is a FESEM micrograph (scale bar: 5 μm) of alumina nanoparticles.

Embodiments of the present disclosure will now be described more fully hereinafter with reference to the accompanying drawings, in which some, but not all embodiments of the disclosure are shown.

The present disclosure will be better understood with reference to the following definitions. As used herein, the words "a" and "an" and the like carry the meaning of "one or more." Within the description of this disclosure, where a numerical limit or range is stated, the endpoints are included unless stated otherwise. Also, all values and subranges within a numerical limit or range are specifically included as if explicitly written out.

As used herein, "composite" refers to a combination of two or more distinct constituent materials into one. The individual components, on an atomic level, remain separate and distinct within the finished structure. The materials may have different physical or chemical properties, that when combined, produce a material with characteristics different from the original components. In some embodiments, a composite may have at least two constituent materials that comprise the same empirical formula but are distinguished by different densities, crystal phases, or a lack of a crystal phase (i.e. an amorphous phase).

In addition, the present disclosure is intended to include all isotopes of atoms occurring in the present compounds and complexes. Isotopes include those atoms having the same atomic number but different mass numbers. By way of general example and without limitation, isotopes of hydrogen include deuterium and tritium. Isotopes of carbon include $^{13}C$ and $^{14}C$. Isotopically-labeled compounds of the disclosure can generally be prepared by conventional techniques known to those skilled in the art or by processes analogous to those described herein, using an appropriate isotopically-labeled reagent in place of the non-labeled reagent otherwise employed.

As defined here, a ceramic or a ceramic material is an inorganic, oxide, nitride, or carbide material. Ceramics are typically crystalline and non-metallic. Some elements, such as carbon or silicon, may be considered ceramics. Ceramic materials are generally resistive against compression, but yield somewhat to shearing, fracturing, and tension, as compared to metals and metal alloys. Ceramics can typically withstand chemical erosion that occurs in other materials subjected to acidic or caustic environments. Ceramics generally can withstand very high temperatures without degrading, such as temperatures that range from 1,000° C. to 1,600° C. Glass is not considered a ceramic because of its amorphous (noncrystalline) character. A "ceramic composite," or "ceramic matrix composite," refers to a composite where at least one of the constituent materials is a ceramic.

Alumina-based ceramics are used in various industries because of their superior thermal and mechanical properties as well as chemical stability and refractoriness. However, brittle behavior of alumina ceramics have restricted their applications [D. Chakravarty, S. Bysakh, K. Muraleedharan, T. N. Rao, R. Sundaresan, Spark plasma sintering of magnesia-doped alumina with high hardness and fracture toughness, J. Am. Ceram. Soc. 91 (2008) 203-208; K. Y. Xie, M. F. Toksoy, K. Kuwelkar, B. Zhang, J. a. Krogstad, R. a. Haber, K. J. Hemker, Effect of Alumina on the Structure and Mechanical Properties of Spark Plasma Sintered Boron Carbide, J. Am. Ceram. Soc. 9 (2014) 3710-3718; T. Oungkulsolmongkol, P. Salee-Art, W. Buggakupta, Hardness and Fracture Toughness of Alumina-Based Particulate Composites with Zirconia and Strontia Additives, J. Met. Mater. Miner. 20 (2010) 71-78; R. G. Duan, G. D. Zhan, J. D. Kuntz, B. H. Kear, A. K. Mukherjee, Spark plasma sintering (SPS) consolidated ceramic composites from plasma-sprayed metastable $Al_2TiO_5$ powder and nano-$Al_2O_3$, $TiO_2$, and MgO powders, Mater. Sci. Eng. A. 373 (2004) 180-186; A. M. Al-Qutub, A. Khalil, N. Saheb, A. S. Hakeem, Wear and friction behavior of Al6061 alloy reinforced with carbon nanotubes, Wear. 297 (2013) 752-761; and S. S. Akhtar, M. U. Siddiqui, R. Kabeer, A. Hakeem, L. Kareem, A. F. Arif, A computational and experimental study on the effective properties of $Al_2O_3$—Ni composites, Int. J. Appl. Ceram. Technol. 14 (2017) 766-778]. Researchers have attempted to improve the toughness by dispersing a second phase into the alumina matrix [S. Grasso, H. Yoshida, H. Porwal, Y. Sakka, M. Reece, Highly transparent α-alumina obtained by low cost high pressure SPS, Ceram. It. 39 (2013) 3243-3248; and R. H. L. Garcia, V. Ussui, N. B. de Lima, E. N. S. Muccillo, D. R. R. Lazar, Physical properties of alumina/yttria-stabilized zirconia composites with improved microstructure, J. Alloys Compd. 486 (2009) 747-753, each incorporated herein by reference in their entirety]. For instance, the impact of adding SiC, $TiB_2$, $ZrO_2$, $SrO_2$ and cBN reinforcements with varying particle sizes to $Al_2O_3$ matrix on the fracture toughness and strength of the composite ceramics have been examined [T. Oungkulsolmongkol, P. Salee-Art, W. Buggakupta, Hardness and Fracture Toughness of Alumina-Based Particulate Composites with Zirconia and Strontia Additives, J. Met. Mater. Miner. 20 (2010) 71-78; H. M. Irshad, B. A. Ahmed, M. A. Ehsan, T. I. Khan, T. Laoui, M. R. Yousaf, A. Ibrahim, A. S. Hakeem, Investigation of the structural and mechanical properties of micro-/nano-sized $Al_2O_3$ and cBN composites prepared by spark plasma sintering, Ceram. Int. 43 (2017) 10645-10653; Y. L. Dong, F. M. Xu, X. L. Shi, C. Zhang, Z. J. Zhang, J. M. Yang, Y. Tan, Fabrication and mechanical properties of nano-/micro-sized $Al_2O_3$/SiC composites, Mater. Sci. Eng. A. 504 (2009) 49-54; I. Álvarez, R. Torrecillas, W. Solis, P. Peretyagin, A. Fernández, Microstructural design of $Al_2O_3$—SiC nanocomposites by Spark Plasma Sintering, Ceram. Int. 42 (2016) 17248-17253; A. Dorri Moghadam, E. Omrani, H. Lopez, L. Zhou, Y. Sohn, P. K. Rohatgi, Strengthening in hybrid alumina-titanium diboride aluminum matrix composites synthesized by ultrasonic assisted reactive mechanical mixing, Maer. Sci. Eng. A. 702 (2017) 312-321; T. Rajmohan, K. Palanikumar, J. P. Davim, Analysis of Surface Integrity in drilling metal matrix and hybrid metal matrix composites, J. Mater. Sci. Technol. 28 (2012) 761-768; and S. Wan, W. Sub, K. Sohn, C. Son, S. Lee, Improvement of flexure strength and fracture toughness in alumina matrix composites reinforced with carbon nanotubes, 517 (2009) 293-299, each incorporated herein by reference in their entirety]. Moreover, due to low toughness of certain matrices, secondary ceramic reinforcement phases such as particulates and fibers have been introduced [J. Liu, H. Yan, K. Jiang, Mechanical properties of graphene platelet-reinforced alumina ceramic composites, Ceram. Int. 39 (2013) 6215-6221; I. Ahmad, H. Cao, H. Chen, H. Zhao, A. Kennedy, Y. Q. Zhu, Carbon nanotube toughened aluminium oxide nanocomposite, J. Eur. Ceram. Soc. 30 (2010) 865-873; and S. Vichaphund, D. Atong, Fabrication of Ni-alumina composite membrane via powder and bulk impregnation method for hydrogen separation, J. Mater. Sci. Technol. 26 (2010) 589-596, each incorporated herein by reference in their entirety]. Carbon-based secondary phases such as carbon nanofillers (CNF), carbon nanotubes (CNT), and graphene have been used as a reinforcement due to their excellent thermal, mechanical, and electrical properties [S. I. Cha, K. T. Kim, K. H. Lee, C. B. Mo, S. H. Hong, Strengthening and toughening of carbon nanotube reinforced alumina nanocomposite fabricated by molecular level mixing process, Scr. Mater. 53 (2005) 793-797; E. Hammel, X. Tang, M. Trampert, T. Schmitt, K. Mauthner, A. Eder, P. Pötschke, Carbon nanofibers for composite applications, Carbon N. Y. 42 (2004) 1153-1158; K. S. Novoselov, V. I. Fal'Ko, L. Colombo, P. R. Gellert, M. G. Schwab, K. Kim, A roadmap for graphene, Nature. 490 (2012) 192-200; J. Sun, L. Gao, X. Jin, Reinforcement of alumina matrix with multi-walled carbon nanotubes, Ceram. Int. 31 (2005) 893-896; A. Das, S. P. Harimkar, Effect of graphene nanoplate and silicon carbide nanoparticle reinforcement on mechanical and tribological properties of spark plasma sintered magnesium matrix composites, J. Mater. Sci. Technol. 30 (2014) 1059-1070; M. Kitiwan, D. Atong, Effects of Porous Alumina Support and Plating Time on Electroless Plating of Palladium Membrane, J. Mater. Sci. Technol. 26 (2010)

1148-1152; T. Zhang, L. Kumari, G. H. Du, W. Z. Li, Q. W. Wang, K. Balani, A. Agarwal, Composites: Part A Mechanical properties of carbon nanotube—alumina nanocomposites synthesized by chemical vapor deposition and spark plasma sintering, Compos. Part A. 40 (2009) 86-93; F. Gutiérrez-Mora, R. Cano-Crespo, A. Rincón, R. Moreno, A. Domínguez-Rodríguez, Friction and wear behavior of alumina-based graphene and CNFs composites, J. Eur. Ceram. Soc. 37 (2017) 3805-3812; and R. Cano-crespo, B. Malmal, D. Gómez-garcía, A. Domínguez-rodríguez, R. Moreno, Journal of the European Ceramic Society Carbon nanofibers replacing graphene oxide in ceramic composites as a reinforcing-phase: Is it feasible?, 37 (2017) 3791-3796, each incorporated herein by reference in their entirety]. N. Bakhsh et al. [N. Bakhsh, F. A. Khalid, A. S. Hakeem, Synthesis and characterization of pressureless sintered carbon nanotube reinforced alumina nanocomposites, Mater. Sci. Eng. A. 578 (2013) 422-429, incorporated herein by reference in its entirety] observed up to 10% improvement in bending strength of monolithic alumina after reinforcement with 1.0 wt. % of multi-walled carbon nanotubes.

Introduction of boron nitride nanotubes (BNNTs) into alumina ceramics increased the mechanical properties of monolithic alumina ceramic. Specifically, addition of 2.5 wt. % of BNNTs increased the bending strength of the composites by up to 69% and addition of 1.5 wt. % of BNNTs enhanced the fracture strength of the composites by up to 31% [W.-L. Wang, J.-Q. Bi, S.-R. Wang, K.-N. Sun, M. Du, N N. Long, Y.-J. Bai, Microstructure and mechanical properties of alumina ceramics reinforced by boron nitride nanotubes, J. Eur. Ceram. Soc. 31 (2011) 2277-2284, incorporated herein by reference in its entirety]. Bernal et al. reinforced the $ZrO_2$ toughened $Al_2O_3$ (ZTA) composites with CNTs and found a 44% increase in fracture toughness as compared to the pure ZTA [M. H. Bocanegra-Bemal, J. Echeberria, J. Ollo, A. Garcia-Reyes, C. Domínguez-Rios, A. Reyes-Rojas, A. Aguilar-Elguezabal, A comparison of the effects of multi-wall and single-wall carbon nanotube additions on the properties of zirconia toughened alumina composites, Carbon N. Y. 49 (2011) 1599-1607, incorporated herein by reference in its entirety]. Similarly, J. Liu et al. [J. Liu, H. Yan, M. J. Reece, K. Jiang, Toughening of zirconia/alumina composites by the addition of graphene platelets, J. Eur. Ceram. Soc. 32 (2012) 4185-4193, incorporated herein by reference in its entirety] improved the fracture toughness of ZTA composites by up to 41% via reinforcement with 0.8 vol % of graphene platelets.

An aspect of the present disclosure relates to a method of producing a composite involving oil fly ash dispersed in an alumina matrix. This method involves mixing oil fly ash and alumina to form a mixture, and sintering the mixture, thereby producing the composite. The composite disclosed herein may be considered a ceramic composite or a ceramic matrix composite.

As used herein, alumina refers to aluminum oxide, a chemical compound of aluminum and oxygen with the chemical formula $Al_2O_3$. Aluminum oxide is commonly called alumina and may also be referred to as aloxide, aloxite, or alundum. It is the most commonly occurring of several aluminum oxides and specifically identified as aluminum (III) oxide. $Al_2O_3$ is significant in its use to produce aluminum metals and noted for its high melting point. Non-limiting examples of alumina applicable to the present disclosure include aluminum oxide ($Al_2O_3$), alumina monohydrate, alumina trihydrate, calcined aluminum hydroxide minerals such as gibbsite, bayerite and boehmite, and the like. In a preferred embodiment, the alumina is aluminum oxide.

Alumina commonly occurs in its crystalline polymorphic phase $\alpha$-$Al_2O_3$ which composes the mineral corundum, the most thermodynamically stable form of aluminum oxide. In the corundum form ($\alpha$-$Al_2O_3$), the oxygen ions nearly form a hexagonal close-packed structure with aluminum ions filling two-thirds of the octahedral interstices. Each $Al^{3+}$ center is octahedral. In term of its crystallography, corundum adopts a trigonal Bravais lattice and its primitive cell contains two formula units of aluminum oxide. Alumina also exists in other phases, including the transition cubic $\gamma$ and $\eta$ phases, the monoclinic $\theta$ phase, the hexagonal $\chi$ phase, the orthorhombic $\kappa$ phase and the transition $\delta$ phase that can be tetragonal or orthorhombic. Each has unique crystal structure and properties.

In the present disclosure, the alumina may be $\alpha$-alumina, $\gamma$-alumina, $\eta$-alumina, $\theta$-alumina, $\delta$-alumina, $\chi$-alumina, and $\kappa$-alumina. In one embodiment, the alumina may be comprised of a plurality of different crystallographic phases. Preferably, the alumina of the present disclosure consists substantially of $\alpha$-alumina, preferably greater than 75% by weight relative to the total weight of alumina, preferably greater than 80%, preferably greater than 85%, preferably greater than 90%, preferably greater than 95%, preferably greater than 98%, preferably greater than 99% by weight relative to the total weight of the alumina. In at least one embodiment, the alumina consists essentially of $\alpha$-alumina ($\alpha$-$Al_2O_3$).

A particle is defined as a small object that behaves as a whole unit with respect to its transport and properties. The alumina of the present disclosure in any of its embodiments may be in the form of particles of the same shape or different shapes, and of the same size or different sizes. An average particle size (e.g. average diameter) of a particle, as used herein, refers to the average linear distance measured from one point on the particle through the center of the particle to a point directly across from it. In one embodiment, the alumina is in the form of particles with an average particle size of 0.005-100 μm, preferably 0.01-75 μm, preferably 0.1-50 μm, preferably 0.25-25 μm, preferably 0.5-10 μm, preferably 1-5 μm. A purity of the alumina particles is at least 99 wt %, preferably at least 99.5 wt %, more preferably at least 99.8 wt % relative to a total weight of the alumina particles.

As used herein, microparticles are particles having an average diameter between 1 and 1,000 μm in size. Nanoparticles are particles having an average diameter between 1 and 1,000 nm in size. In a preferred embodiment, the alumina used herein is in the form of microparticles having an average diameter in a range of 1-100 μm, 4-75 μm, 5-50 μm, 7-40 μm, 9-30 μm, 11-25 μm, 13-20 μm, 14-18 μm, or about 15 μm. In another preferred embodiment, the alumina is in the form of nanoparticles having an average diameter in a range of 1-999 nm, 5-900 nm, 10-800 nm, 20-600 nm, 40-400 nm, 60-300 nm, 80-250 nm, 100-200 nm, 120-180 nm, 140-160 nm, or about 150 nm. In a most preferred embodiment, the alumina is in the form of nanoparticles with an average diameter in a range of 100-300 nm, 125-200 nm, or 150-160 nm.

The terms "oil fly ash", "OFA", "raw oil fly ash", and "waste oil fly ash" refer to a carbon waste residue generated in combustion of crude oil, for example, in power generation plants [M. Anwar Parvez, H. I. Al-Abdul Wahhab, R. A. Shawabkeh, I. A. Hussein, Asphalt modification using acid treated waste oil fly ash, Constr. Build. Mater. 70 (2014)

201-209; and M. J. Khan, A. A. Al-Juhani, R. Shawabkeh, A. Ul-Hamid, I. A. Hussein, Chemical modification of waste oil fly ash for improved mechanical and thermal properties of low density polyethylene composites, J. Polym. Res. 18 (2011) 2275-2284]. Accordingly, oil fly ash is considered a cheap and abundant raw material. Oil fly ash has been used in cement production and polymer composites to improve mechanical properties, and as adsorbents for solute recovery in dye industries. Furthermore, repurposing of OFA for ceramic production reduces the waste management burden of power plants and other major sources of OFA [M. J. Khan, A. A. Al-Juhani, R. Shawabkeh, A. Ul-Hamid, I. A. Hussein, Chemical modification of waste oil fly ash for improved mechanical and thermal properties of low density polyethylene composites, J. Polym. Res. 18 (2011) 2275-2284; R. Shawabkeh, A. Al-Harahsheh, A. Al-Otoom, Copper and zinc sorption by treated oil shale ash, Sep. Purif. Technol. 40 (2004) 251-257; R. Shawabkeh, M. J. Khan, A. A. Al-Juhani, H. I. Al-Abdul Wahhab, I. A. Hussein, Enhancement of surface properties of oil fly ash by chemical treatment, Appl. Surf. Sci. 258 (2011) 1643-1650; and T. S. Yeh, Y. S. Wu, Y. H. Lee, Graphitization of unburned carbon from oil-fired fly ash applied for anode materials of high power lithium ion batteries, Mater. Chem. Phys. 130 (2011) 309-315].

Raw oil fly ash generally has a carbon content of at least 65 wt %, for example a carbon content of 65-95 wt %, 70-90 wt %, 75-85 wt %, or 79-82 wt %, with the rest of the components being primarily sulfur, oxygen, silicon, as well as metals or semimetals including but not limited to vanadium, nickel, iron, aluminum, magnesium, calcium, copper, zinc, chromium, cobalt, lead, manganese, mercury, molybdenum, selenium, strontium, thallium, arsenic, beryllium, boron, cadmium, and organic compounds such as dioxins or polychlorinated dibenzodioxins (PCDDs) and polyaromatic hydrocarbons (PAHs). The raw oil fly ash of the present disclosure may be collected from a power plant, such as an electricity plant at Saudi Electricity Company located in Saudi Arabia. In certain embodiments, the oxygen content of the raw oil fly ash ranges from 4-16 wt %, preferably 5-13 wt %, more preferably 6-10 wt %, or about 8 wt % relative to a total weight of the raw oil fly ash. In a related embodiment, the sulfur content of the raw oil fly ash ranges from 5-17 wt %, preferably 6-14 wt %, more preferably 7-11 wt %, or about 8.7 wt % relative to a total weight of the raw oil fly ash. In another related embodiment, the nickel content of the raw oil fly ash ranges from 0.6-2.8 wt %, preferably 0.8-2.2 wt %, more preferably 1.2-1.6 wt %, or about 1.4 wt % relative to a total weight of the raw oil fly ash. In another related embodiment, the vanadium content of the raw oil fly ash ranges from 0.8-3.8 wt %, preferably 1.2-3.2 wt %, more preferably 1.6-2.2 wt %, or about 1.8 wt % relative to a total weight of the raw oil fly ash. In another related embodiment, the iron content of the raw oil fly ash ranges from 0.5-2.1 wt %, preferably 0.7-1.6 wt %, more preferably 0.9-1.2 wt %, or about 1.1 wt % relative to a total weight of the raw oil fly ash (see Table 2).

The raw oil fly ash may be used herein directly as the oil fly ash without further treatment. However, in at least one embodiment, the oil fly ash of the present disclosure is treated with an acid prior to the mixing with the alumina. For example, raw oil fly ash may be collected from a power plant, cleaned with water, and dried at a temperature of 80-160° C., 90-140° C., or 100-120° C. to form a dried powder. The dried powder may be mixed with an acid solution to form an acidic suspension. The acid solution may contain one or more inorganic or mineral acids selected from nitric acid, sulfuric acid, phosphoric acid, perchloric acid, hydrobromic acid, hydrochloric acid, hydroiodic acid, hydrofluoric acid, and boric acid. In certain embodiments, the acid solution contains two or three mineral acids selected from nitric acid, sulfuric acid, and phosphoric acid. In one embodiment, the acid solution contains sulfuric acid and nitric acid at a volume ratio in a range of 1:1 to 5:1, 2:1 to 4:1, or about 3:1. Alternatively, one or more organic acids may be used herein as the acid. Examples of organic acids include, but are not limited to, formic acid, acetic acid, propionic acid, butyric acid, valeic acid, caproic acid, oxalic acid, lactic acid, malic acid, citric acid, carbonic acid, benzoic acid, phenol, uric acid, carboxylic acids, and sulfonic acid. In certain embodiment, the acid solution may contain mixtures of mineral and organic acids.

The acidic suspension may be agitated for 1-24 hour, 2-20 hours, 4-16 hours, 6-12 hours, or until the raw oil fly ash is sufficiently treated. A solid residue may be obtained at the end of the acid treatment, which may be filtered and rinsed repeatedly with water, preferably distilled water, then dried at a temperature of 60-150° C., 80-120° C., or about 90° C., thereby forming the acid-treated oil fly ash. The purpose of acid treatment is to reduce or eliminate the trace metals such as iron, nickel, and vanadium from the raw oil fly ash.

In one embodiment, the acid-treated oil fly ash has a carbon content ranging from 55-80 wt %, preferably 60-75 wt %, more preferably 65-70 wt %, or about 67 wt % relative to a total weight of the acid-treated oil fly ash. In preferred embodiments, the acid-treated oil fly ash has greater oxygen and sulfur contents, as well as lower iron, nickel, and vanadium contents, than those of the raw oil fly ash. In certain embodiments, the oxygen content of the acid-treated oil fly ash ranges from 15-30 wt %, preferably 17-25 wt %, more preferably 19-22 wt %, or about 20 wt % relative to a total weight of the acid-treated oil fly ash. In a related embodiment, the sulfur content of the acid-treated oil fly ash ranges from 9-25 wt %, preferably 11-20 wt %, more preferably 12-15 wt %, or about 13 wt % relative to a total weight of the acid-treated oil fly ash. The aforementioned weight percentages of carbon, oxygen, sulfur, nickel, vanadium, and iron may be determined by elemental analysis techniques such as energy-dispersive X-ray spectroscopy (EDX), X-ray photoelectron spectroscopy (XPS), inductively coupled plasma mass spectrometry (ICP-MS), neutron activation analysis, and a combination thereof.

In one embodiment, the acid-treated oil fly ash may comprise substantially no nickel, for instance, less than 0.1 wt % of nickel, preferably less than 0.05 wt %, more preferably less than 0.01 wt % of nickel, relative to a total weight of the acid-treated oil fly ash. In at least one embodiment, the acid-treated oil fly ash is devoid of nickel. In another embodiment, the acid-treated oil fly ash may comprise substantially no vanadium, for instance, less than 0.1 wt % of vanadium, preferably less than 0.05 wt %, more preferably less than 0.01 wt % of vanadium, relative to a total weight of the acid-treated oil fly ash. In at least one embodiment, the acid-treated oil fly ash is devoid of vanadium. In another embodiment, the acid-treated oil fly ash may comprise substantially no iron, for instance, less than 0.1 wt % of iron, preferably less than 0.05 wt %, more preferably less than 0.01 wt % of iron, relative to a total weight of the acid-treated oil fly ash. In at least one embodiment, the acid-treated oil fly ash is devoid of iron. In some embodiments, the acid-treated oil fly ash is devoid of nickel, vanadium, and iron (see Table 2). Preferably, the oil fly ash of the present disclosure is the above described acid-treated oil fly ash. In one embodiment, the oil fly ash used herein consists of: (i) carbon, (ii) oxygen, and (iii) sulfur.

In one or more embodiments, the oil fly ash used herein is in the form of porous particles. The particles of the oil fly ash may be spherical, ellipsoidal, oblong, ovoidal, or some other rounded shape. Alternatively, the particles may be angular, rectangular, prismoidal, or some other angular shape. In a preferred embodiment, the oil fly ash particles are spheres, or substantially spherical. In another preferred embodiment, the oil fly ash particles have an average particle size of 2-100 µm, 8-50 µm, 16-40 µm, or 20-30 µm. In a more preferred embodiment, the oil fly ash is in the form of spherical particles with an average particle size of 5-50 µm, preferably 10-45 µm, preferably 15-40 µm, preferably 20-35 µm, preferably 25-30 µm. The size and shape of particles may be analyzed by techniques such as dynamic light scattering (DLS), scanning electron microscopy (SEM), transmission electron microscopy (TEM), and/or atomic force microscopy (AFM).

In some embodiments, the oil fly ash particles of the present disclosure are monodisperse, having a coefficient of variation or relative standard deviation, expressed as a percentage and defined as the ratio of the particle size standard deviation ($\sigma$) to the particle size mean ($\mu$) multiplied by 100 of less than 25%, preferably less than 10%, preferably less than 8%, preferably less than 6%, preferably less than 5%, preferably less than 4%, preferably less than 3%, preferably less than 2%. In a preferred embodiment, the oil fly ash particles used herein are monodisperse having a particle size distribution ranging from 80% of the average particle size to 120% of the average particle size, preferably 90-110%, preferably 95-105% of the average particle size. However, in certain embodiments, the oil fly ash particles are not monodisperse.

The surface of the oil fly ash particles may be mesoporous or microporous. The term "microporous" refers to a surface having an average pore diameter of less than 2 nm, while the term "mesoporous" refers to a surface having an average pore diameter of 2-50 nm. In one embodiment, the oil fly ash particles used herein in any of its embodiments are mesoporous and have a pore size of 2-50 nm, 5-40 nm, 10-30 nm, 12-25 nm, 15-20 nm, or 17-19 nm. In an alternative embodiment, the oil fly ash particles are microporous and have a pore size of 0.5-1.9 nm, 0.8-1.8 nm, 1-1.7 nm, 1.2-1.6 nm, or 1.4-1.5 nm. In certain embodiments, the oil fly ash particles have porous structures with a pore size larger than 50 nm, for example, a pore size of 80 nm, 100 nm, 500 nm, 1 µm, or 10 µm. Pore size may be determined by techniques including, but not limited to, gas adsorption (e.g. $N_2$ adsorption), mercury intrusion porosimetry, and imaging techniques such as scanning electron microscopy (SEM), and x-ray computed tomography (XRCT).

The aforementioned components (e.g. alumina and oil fly ash) may be mixed to form a mixture. In most embodiments, a weight ratio of the alumina to the oil fly ash in the mixture is in a range of 9:1 to 500:1, preferably 10:1 to 400:1, preferably 11:1 to 300:1, preferably 12:1 to 250:1, preferably 13:1 to 200:1, preferably 14:1 to 150:1, preferably 15:1 to 125:1, preferably 16:1 to 110:1, preferably 17:1 to 99:1, preferably 18:1 to 95:1, preferably 19:1 to 90:1, preferably 20:1 to 85:1, preferably 22:1 to 80:1, preferably 24:1 to 75:1, preferably 25:1 to 70:1, preferably 28:1 to 60:1, preferably 30:1 to 49:1, preferably 32:1 to 45:1, preferably 35:1 to 40:1. In at least one embodiment, the weight ratio of the alumina to the oil fly ash is greater than 4:1, preferably greater than 5:1, more preferably greater than 6:1. In a most preferred embodiment, the weight ratio of the alumina to the oil fly ash is about 99:1. In one embodiment, the mixture consists essentially of, or consists of the alumina and the oil fly ash.

Fluxing agents may be used in sintering to reduce or eliminate surface porosity and interconnected porosity. Exemplary fluxing agents include nepheline syenite, feldspar, synthetic clay, and natural clay. In one embodiment, prior to the sintering, the mixture comprises substantially no fluxing agent, for instance, less than 0.1 wt % of fluxing agent, preferably less than 0.05 wt %, more preferably less than 0.01 wt % of fluxing agent, relative to a total weight of the mixture. In at least one embodiment, the mixture is devoid of any fluxing agent. Exemplary vaporizable materials include water, carbon dioxide, sulfur dioxide, hydrogen sulfide, nitrogen, argon, helium, neon, methane, carbon monoxide, hydrogen, oxygen, hydrogen chloride (HCl), hydrogen fluoride (HF), hydrogen bromide (HBr), nitrogen oxide, sulfur hexafluoride, carbonyl sulfide, and volcanic gases. In one embodiment, prior to the sintering, the mixture comprises substantially no vaporizable material, for instance, less than 0.5 wt % of fluxing agent, preferably less than 0.1 wt %, more preferably less than 0.05 wt % of vaporizable material, relative to a total weight of the mixture. In one embodiment, the mixture is devoid of any vaporizable material. In at least one embodiment, the fluxing agent and the vaporizable material do not coexist in the mixture of the present disclosure prior to the sintering.

Preferably the mixing involves sonication. In a preferred embodiment, the components are dispersed in a sufficient amount of an organic solvent, preferably volatile at room temperature, to form a slurry which is sonicated for 10-60 minutes, preferably 15-45 minutes, preferably 25-35 minutes. The sonication may be applied by inserting an ultrasonic probe into the slurry or by placing a container of the slurry into a sonication bath. The sonication may be pulsed or continuous. Non-limiting examples of the organic solvent include hydrocarbons, such as hexane, alcohols, such as ethanol, methanol, propanol, isopropanol, butanol, ketones and esters. Preferably, the solvent is an alcohol. More preferably, the alcohol has a melting point lower than 0° C. and a boiling point lower than 100° C. In a preferred embodiment, the alcohol is ethanol. The organic solvent may act as a viscosity modifying agent, providing a suitable viscosity for handling the slurry and accomplishing the mixing. In addition, the solvent may have a viscosity ranging from 0.5-2 cP, preferably 0.5-1.5 cP, more preferably 0.5-1.2 cP. Any amount of liquid that accomplishes the mixing is acceptable. Preferably, the solids content is between 10-50 vol %, preferably 15-35 vol %, more preferably 20-30 vol % of the total volume of the slurry. Below this limit, mixing may be ineffective or separation by settling may occur, although a solid content below this limit may still be used depending on the particle size, solvent, and mixing procedure. Above the limit, in some instances, the viscosity may be too high and mixing and de-agglomeration may not be effective. The volatile organic solvent may evaporate during sonication, leaving no residue. Preferably, after the sonication, the slurry is heated to 60-120° C., preferably 70-100° C. or about 100° C. for 1-48 hours, preferably 6-36 hours, more preferably 12-24 hours to remove the solvent residual completely. Alternatively, the mixing of the aforementioned components may involve ball milling. The powders may be mixed with a miller, such as a planetary miller, an attrition mill, a vibratory mill, or a high energy miller.

$Al_2O_3$-based ceramics can be developed using conventional sintering techniques such as hot isostatic pressing and hot pressing [C. Xu, C. Huang, X. Ai, Toughening and strengthening of advanced ceramics with rare earth additives, Ceram. Int. 32 (2006) 423-4291]. The mixture of the present disclosure may be sintered via a sintering process such as hot pressing, hot isostatic pressure, pressureless sintering, and spark plasma sintering. In one embodiment, the sintering is a spark plasma sintering process. Spark plasma sintering (SPS) is an unconventional sintering technique in which a powdered material is subjected to a combination of heat and uniaxial pressure, resulting in bonding between particles and formation of a coherent body with enhanced mechanical properties. SPS process may diminish the porosity between particle edges quickly thus resulting in an increase in density [R. Cano-crespo, B. Malmal, D. Gómez-garcía, A. Domínguez-rodríguez, R. Moreno, Journal of the European Ceramic Society Carbon nanofibers replacing graphene oxide in ceramic composites as a reinforcing-phase: Is it feasible?, 37 (2017) 3791-3796; B. N. Kim, K. Hiraga, K. Morita, H. Yoshida, Spark plasma sintering of transparent alumina, Scr. Mater. 57 (2007) 607-610; Z. A. Munir, U. Anselmi-Tamburini, M. Ohyanagi, The effect of electric field and pressure on the synthesis and consolidation of materials: A review of the spark plasma sintering method, J. Mater. Sci. 41 (2006) 763-777; Z. Shen, M. Johnsson, Z. Zhao, M. Nygren, Spark plasma sintering of alumina, J. Am. Ceram. Soc. 85 (2002) 1921-1927; K. J. Zhan G, Alumina-based nanocomposites consolidated by spark plasma sintering, Scr. Mater. 47 (2002) 737-741; N. Saheb, M. Shahzeb Khan, A. S. Hakeem, Effect of processing on mechanically alloyed and spark plasma sintered Al—$Al_2O_3$ nanocomposites, J. Nanomater. 2015 (2015) 1-13; Guo-dong Zhan, Amiya K. Mukherjee, Carbon Nanotube Reinforced Alumina-Based Ceramics with Novel Mechanical, Electrical, and Thermal Properties, Int. J. Appl. Ceram. Technol., 1, 161-171 (2004); and H. M. Irshad, A. S. Hakeem, B. A. Ahmed, S. Ali, S. Ali, S. Ali, M. A. Ehsan, T. Laoui, Effect of Ni content and $Al_2O_3$ particle size on the thermal and mechanical properties of $Al_2O_3$/Ni composites prepared by spark plasma sintering, Int. J. Refract. Met. Hard Mater. 76 (2018) 25-32, each incorporated herein by reference in their entirety]. SPS technique may be used to consolidate various inorganic compounds and composites thereof within a short sintering time. Thus, spark plasma sintering may be preferred over the other sintering processes because spark plasma sintering densifies the compacted powders more quickly at relatively low temperatures.

For the sintering step, the mixture may be transferred to a die with a diameter of 10-50 mm, preferably 15-35 mm, more preferably 15-25 mm. The die may comprise graphite. The mixture may be compacted into the die at ambient temperature, or while heating or sintering. The compacted mixture may be in the form of a disc having a similar diameter as the graphite die, for example a thickness of 1-30 mm, 2-15 mm, or 3-10 mm. However, in other embodiments, the compacted mixture may be in other forms, such as a rectangular prism, depending on the shape of the die. In one embodiment, the sintering is performed in an inert atmosphere, preferably provided by argon or nitrogen gas.

In a preferred embodiment, a uniaxial pressure is applied to the die in a direction that is normal to the ground. In one embodiment, the sintering comprises applying a uniaxial pressure to the powder mixture, where the uniaxial pressure may be 30-80 MPa, preferably 35-70 MPa, more preferably 40-60 MPa, even more preferably 45-55 MPa, or about 50 MPa.

In one embodiment, the sintering comprises heating the mixture at a heating rate ranging from 5-500° C./min, preferably 50-250° C./min, more preferably 75-150° C./min, or about 100° C./min. However, in other embodiments, heating rates of lower than 5° C./min or greater than 500° C./min may be used successfully. The heating may comprise one or more heating steps. In a preferred embodiment, the heating consists of only one heating step.

In one embodiment, the sintering is performed at a temperature ranging from 1,200-1,600° C., preferably 1,300-1,500° C., more preferably 1,350-1,450° C., even more preferably about 1,400° C.

In a related embodiment, the sintering is performed at the above specified temperature with a holding time ranging from 5-60 minutes, preferably 7-30 minutes, more preferably 9-15 minutes, even more preferably about 10 minutes. In at least one embodiment, the holding time is no greater than 2 hours. As used herein, the term "holding time" refers to the duration for which the mixture is exposed to an isothermal sintering at the above specified temperature, or at the specified temperature within a small temperature variation range, preferably within ±5° C., more preferably within ±2° C., most preferably within ±1° C.

In a spark plasma sintering process, composite starts to cool down once the current is switched off. The cooling of the composite may be controlled and/or accelerated with a pre-set program. In a preferred embodiment, the composite is cooled down at a rate ranging from 1-20° C./s, preferably 1-10° C./s, more preferably 2-5° C./s. The composite may be cooled by a flow of an inert gas, such as nitrogen or argon. The composite may be cooled to a temperature ranging from 20-40° C., preferably 20-30° C., more preferably 20-25° C. In one embodiment, the composite may be cooled down to 20-30° C. within 15 minutes, preferably within 12 minutes, even more preferably within 10 minutes. The composite may be cleaned to remove graphite or other contaminants from the die or sintering apparatus, and the composite may be cut or polished.

As noted earlier, an aspect of the present disclosure relates to a method of making a composite involving oil fly ash dispersed in alumina matrix. In one embodiment, the alumina matrix of the composite consists of only α-alumina phase. Alternatively, the composite may comprise an alumina matrix in a crystalline phase other than α-alumina phase. In another embodiment, the alumina matrix comprises a plurality of different crystallographic phases selected from α-alumina, γ-alumina, η-alumina, θ-alumina, δ-alumina, χ-alumina, and κ-alumina phases.

Preferably, the composite comprises carbon dispersed in the alumina matrix. In one embodiment, the carbon of the composite is derived from the oil fly ash and comprises graphite, which is a crystalline form of the element carbon with its atoms arranged in a hexagonal structure. In certain embodiments, the carbon of the composite may comprise other crystalline phases other than graphite, or the carbon may be amorphous. The phase analysis of the alumina matrix and degree of graphitization of the oil fly ash may be estimated via techniques such as Raman spectroscopy and XRD (see Example 7). In one embodiment, the carbon may be in the form of spherical particles, which may have similar diameters as described previously for the oil fly ash particles. However, the shape or size of the oil fly ash may change during the sintering. In a preferred embodiment, the carbon derived from oil fly ash is present in the composite in elongated forms such as fiber-like, needle-like, and flake-like shapes.

The morphology of the composite are studied with electron microscopy, preferably scanning electron microscopy (SEM), such as FESEM. The composite may have pores with a pore size ranging from 1-5 μm, 1.5-4 μm, or 2-3 μm, and/or pores with a pore size ranging from 50-500 nm, 100-400 nm, or 200-300 nm. The porosity of the composite is at most 20%, preferably at most 15%, more preferably at most 5%, even more preferably at most 1%. As reinforcement (i.e. oil fly ash) tends to settle along grain boundaries of the alumina matrix, porosity of the composite may increase with an increasing amount of oil fly ash present in the mixture [N. Saheb, N. U. Qadir, M. U. Siddiqui, A. F. M. Arif, S. S. Akhtar, N. Al-Aqeeli, Characterization of nanoreinforcement dispersion in inorganic nanocomposites: A review, Materials (Basel). 7 (2014) 4148-4181, incorporated herein by reference in its entirety]. In one embodiment, the composite disclosed herein does not have pores.

In one embodiment, the composite has a density of 3.5-4.5 g/cm$^3$, preferably 3.6-4.2 g/cm$^3$, more preferably 3.7-4 g/cm$^3$, even more preferably 3.8-3.9 g/cm$^3$. In one embodiment, the composite may have a density of 3.53-3.81 g/cm$^3$ or 3.59-3.85 g/cm$^3$. However, in some embodiments, the composite may have a density of less than 3.5 g/cm$^3$ or greater than 4.5 g/cm$^3$. The density may be measured based on Archimedes' method with deionized water as the immersion medium, using density determination equipment.

In one embodiment, the composite has a Vickers hardness of 11-25 GPa, preferably 12-22 GPa, preferably 14-20 GPa, preferably 16-18 GPa. In one embodiment, the composite has a Vickers hardness of 11.9-17.6 GPa or 14.6-20.6 GPa. However, in some embodiments, the composite may have a Vickers hardness of less than 11 GPa or greater than 25 GPa. Here, the Vickers hardness is measured under a load of 20 N (2 kg).

In one embodiment, the composite has a fracture toughness of 3.8-7 MPa×m$^{1/2}$, preferably 4-6 MPa×m$^{1/2}$, more preferably 4.5-5 MPa×m$^{1/2}$. In one embodiment, the composite has a fracture toughness of 3.89-4.17 MPa×m$^{1/2}$ or 4.26-4.85 MPa×m$^{1/2}$. However, in some embodiments, the composite may have a fracture toughness of less than 3.8 MPa×m$^{1/2}$ or greater than 7 MPa×m$^{1/2}$. The unit MPa×m$^{1/2}$ may also be written as MPa√m. The fracture toughness may be determined by the indentation method or some other technique.

In one embodiment, the composite has a coefficient of thermal expansion of 6-7 ppm×K$^{-1}$, preferably 6.2-6.8 ppm×K$^{-1}$, even more preferably 6.4-6.6 ppm×K$^{-1}$. In one embodiment, the composite has a coefficient of thermal expansion of 6.34-6.62 ppm×K$^{-1}$ or 6.17-6.57 ppm×K$^{-1}$. However, in some embodiments, the composite may have a coefficient of thermal expansion of less than 6 ppm×K$^{-1}$ or greater than 7 ppm×K$^{-1}$. Coefficients of thermal expansion may be determined on a sample undergoing a thermal cycle via techniques such as dilatometry, interferometry, and thermomechanical analysis. In one embodiment, the coefficients of the composite is measured using a Mettler Toledo instrument (TMA/SDTA-LF/1100) at a temperature cycle from room temperature to about 600° C. with a heating rate of 10° C./min.

As defined herein, thermal conductivity is a property of a material to conduct heat or alternatively the ability of a material to absorb heat. It can also be defined as the quantity of heat transmitted through a unit thickness of a material due to a unit temperature or the ratio between the heat flux and the temperature gradient. The SI units for thermal conductivity is measured in watts per meter kelvin W/m·K. In one embodiment, the composite has a thermal conductivity of 7-30 W/m·K, preferably 12-25 W/m·K, more preferably 15-20 W/m·K at a temperature ranging from 20-120° C., 25-100° C., or 35-50° C. In one embodiment, the composite has a thermal conductivity of 22-28 W/m·K, preferably 23-27 W/m·K, more preferably 15-20 W/m·K at a temperature ranging from 10-35° C., 15-30° C., or about 25° C. In another embodiment, the composite has a thermal conductivity of 12-25 W/m·K, preferably 15-22 W/m·K, more preferably 18-20 W/m·K at a temperature ranging from 35-75° C., 40-65° C., or about 50° C. In another embodiment, the composite has a thermal conductivity of 7-20 W/m·K, preferably 8-18 W/m·K, more preferably 14-16 W/m·K at a temperature ranging from 75-120° C., 90-110° C., or about 100° C.

As summarized in Table 3, the particle size of the alumina as well as the wt % of oil fly ash (or a weight ratio of alumina to oil fly ash) initially added to the mixture prior to the sintering may influence the density, mechanical properties (e.g. Vickers hardness, fracture toughness), and thermal properties (e.g. thermal expansion, thermal conductivity) of the composite.

In one embodiment, where the oil fly ash is present in the mixture in an amount of about 1 wt %, the density of the composite is at least 5% greater, preferably at least 6% greater, more preferably at least 8% greater than that of the composite obtained from sintering a mixture having 2-5 wt % or 3-4 wt % of the oil fly ash. In another embodiment, where the oil fly ash is present in the mixture in an amount of about 1 wt %, the Vickers hardness of the composite is at least 20% greater, preferably at least 30% greater, more preferably at least 35% greater than that of the composite obtained from sintering a mixture having 2-5 wt % or 3-4 wt % of the oil fly ash. In another embodiment, where the oil fly ash is present in the mixture in an amount of about 1 wt %, the thermal conductivity of the composite is at least 5% less, preferably at least 12% less, more preferably at least 40% less than that of the composite obtained from sintering a mixture having 2-5 wt % or 3-4 wt % of the oil fly ash.

In one embodiment, where the oil fly ash is present in an amount of about 1 wt %, and the alumina is present in the form of nanoparticles in the mixture, the Vickers hardness of the composite is at least 10% greater, preferably at least 14% greater, more preferably at least 18% greater than that of the composite obtained from sintering a mixture having a substantially similar amount of the oil fly ash and alumina present in the form of microparticles. In another embodiment, where the oil fly ash is present in an amount of about 1 wt %, and the alumina is present in the form of nanoparticles in the mixture, the fracture toughness of the composite is at least 6% greater, preferably at least 8% greater, more preferably at least 15% greater than that of the composite obtained from sintering a mixture having a substantially similar amount of the oil fly ash and alumina present in the form of microparticles.

The composite produced by the method disclosed herein may be a part of an abrasive, a tool, a vehicular part, an aerospace component, an engine component, a turbine component, a break-ring, a nozzle, a reactor component, a high temperature refractory shape, a glass forming tool, a mold, a die, a refractory for metal forming, a furnace vent, a stack, or a fixture.

The examples below are intended to further illustrate protocols for preparing, and characterizing the composites, and uses thereof, and are not intended to limit the scope of the claims.

Example 1

Experimental: Materials

Alpha-Al$_2$O$_3$ powders with two different sizes ~150 nm (Chempur, Germany) and ~15 µm (<100 mesh Sigma- Aldrich, USA) were used as the matrices for the composites. Two terminologies such as "nano-sized alumina" and "micro-sized alumina" will be used in the following text representing these powders, respectively. OFA was provided by the Saudi Electricity Company, Saudi Arabia.

Example 2

Experimental: Preparation of the Composites

Initially, oil fly ash was washed with water to remove sand particles and other unwanted contamination. Then, OFA was heated in the oven at 110° C. to remove the moisture. Dried OFA (250 g) was placed in a glass beaker and a solution of sulfuric acid and nitric acid (3:1) was gradually added to the beaker. A hot plate with a magnetic stirrer was used to homogenize the solution. This process was performed for 12 hours. Finally, the mixture was cooled down to room temperature. Deionized water was used to dilute the mixture and a filter paper having 3 μm (mesh size) was used for filtration. After filtration of the mixture, the isolated OFA sample was dried in a furnace at 90° C. The main advantage of acid treatment was to eliminate the trace metals such as iron, nickel, and vanadium from oil fly ash. The weight of each component for the respective composition is shown in Table 1.

removal of the sample. Moreover, a graphite blanket was used to cover the die during sintering to minimize the heat loss. A pyrometer was used to control the sintering temperature. Finally, the sintered samples were ground on 60-grit SiC paper to obtain clean surfaces by removing graphite sheets. Later, grinding machine (AutoMet 300 Buehler, USA) equipped with diamond wheels with various grit sizes (from 74 μm down to 10 μm) was used to grind and polish samples to obtain surface finish of ~0.25 μm.

Example 3

Experimental: Analytical Methods

Archimedes' method (Mettler Toledo equipment) was used to measure the density of sintered samples where deionized water was used as the immersion medium. The hardness measurements on the samples were carried out on a Vicker's hardness tester (Buehler, USA) at a load (P) of 20 N (~2 kg). Ten readings for the hardness were recorded and the average value was reported. Mathematical relationship as shown in eq. (1) was used to measure the fracture toughness ($K_{IC}$), where (2c) represents the average crack length, (2a) represents the average length of the diagonal indent and (H) signifies the Vickers hardness [P. S. Babu, D. Sen, A. Jyothirmayi, L. R. Krishna, D. S. Rao, Influence of

TABLE 1

Composition of alumina-OFA composite in grams (gm)

| | Micro-sized | | | | | | Nano-sized | | | | | |
|---|---|---|---|---|---|---|---|---|---|---|---|---|
| | | | | | | Sample IDs | | | | | | |
| | 1 | 2 | 3 | 4 | 5 | 6 | 7 | 8 | 9 | 10 | 11 | 12 |
| Composition | Pure $Al_2O_3$ | 1 wt. % OFA | 2 wt. % OFA | 3 wt. % OFA | 4 wt. % OFA | 5 wt. % OFA | Pure $Al_2O_3$ | 1 wt. % OFA | 2 wt. % OFA | 3 wt. % OFA | 4 wt. % OFA | 5 wt. % OFA |
| $Al_2O_3$ (gm) | 10 | 9.9 | 9.8 | 9.7 | 9.6 | 9.5 | 10 | 9.9 | 9.8 | 9.7 | 9.6 | 9.5 |
| OFA (gm) | 0 | 0.1 | 0.2 | 0.3 | 0.4 | 0.5 | 0 | 0.1 | 0.2 | 0.3 | 0.4 | 0.5 |

Sample IDs: Alumina particle size was ~15 μm (100 mesh) for samples #1 through #6, and was ~150 nm for samples #7 through # 12.

Powder samples of treated OFA and $Al_2O_3$ were mixed in ethanol using an ultrasonic probe sonicator (Model VC 750, Sonics, USA). Then, the powder mixtures were dried in an oven at 100° C. for 24 h to remove the residual ethanol. Subsequently, samples were collected for sintering experiments.

SPS technique (FCT system, model HP D5, Germany) was used to consolidate the powder mixtures in a graphite die (inner diameter=20 mm) at a sintering temperature of 1400° C. with a holding time of 10 min (sintering parameters were predetermined in accordance to the literature [H. M. Irshad, B. A. Ahmed, M. A. Ehsan, T. I. Khan, T. Laoui, M. R. Yousaf, A. Ibrahim, A. S. Hakeem, Investigation of the structural and mechanical properties of micro-/nano-sized $Al_2O_3$ and cBN composites prepared by spark plasma sintering, Ceram. Int. 43 (2017) 10645-10653; and H. M. Irshad, A. S. Hakeem, B. A. Ahmed, S. Ali, S. Ali, S. Ali, M. A. Ehsan, T. Laoui, Effect of Ni content and $Al_2O_3$ particle size on the thermal and mechanical properties of $Al_2O_3$/Ni composites prepared by spark plasma sintering, Int. J. Refract. Met. Hard Mater. 76 (2018) 25-32, each incorporated herein by reference in their entirety]. The uniaxial pressure and heating rate for sintering were 50 MPa and 100° C./min, respectively. A graphite sheet having a thickness of 0.35 mm was inserted between the powder and graphite die to avoid the wear of the punches and for easy microstructure on the wear and corrosion behavior of detonation sprayed $Cr_2O_3$—$Al_2O_3$ and plasma sprayed $Cr_2O_3$ coatings, 44 (2018) 2351-2357].

$$K_{IC}=0.16\ (c/a)^{-1.5}(Ha^{1/2}) \quad\quad\quad \text{eq. (1)}$$

Thermal conductivity of sintered samples was measured using a thermal conductivity analyzer (C-Therm-TCi, Canada). Thermal expansion or coefficients of thermal expansion (α) of the samples were measured using a Mettler Toledo instrument (TMA/SDTA-LF/1100) at a temperature ranging from room temperature to 600° C. at a heating rate of 10° C./min. For the thermal expansion measurements, the samples with smooth surfaces were cut into shapes having dimensions of 4×4×4 mm approximately. For the phase analysis, X-ray diffractometer (Rigaku MiniFlex, Japan) was used with X-ray source of Cu $K_{\alpha 1}$ radiation (γ=1.5416 Å), an accelerating voltage of 30 kV, and a tube current of 10 mA. A field emission scanning electron microscope (FESEM) by Tescan, Lyra3 (Czech Republic) at an accelerating voltage of 20 kV was used to analyze the morphologies of the samples. Energy dispersive X-ray spectroscopy (EDX) with silicon drift detector (X-Max$^N$, Oxford Instruments, UK) was used to analyze the distribution of component and elemental composition of the samples. Raman spectra of the reinforced OFA particles were obtained using a DXR2 Raman microscope. These spectra were obtained between 300 and 3000 $cm^{-1}$ at ambient temperature using laser light with a wavelength of 532 nm as the excitation source. The laser source power was 2.5 mW.

Example 4

Microstructural and Phase Analysis: FESEM, XRD, and Raman of OFA

Figure 1C:
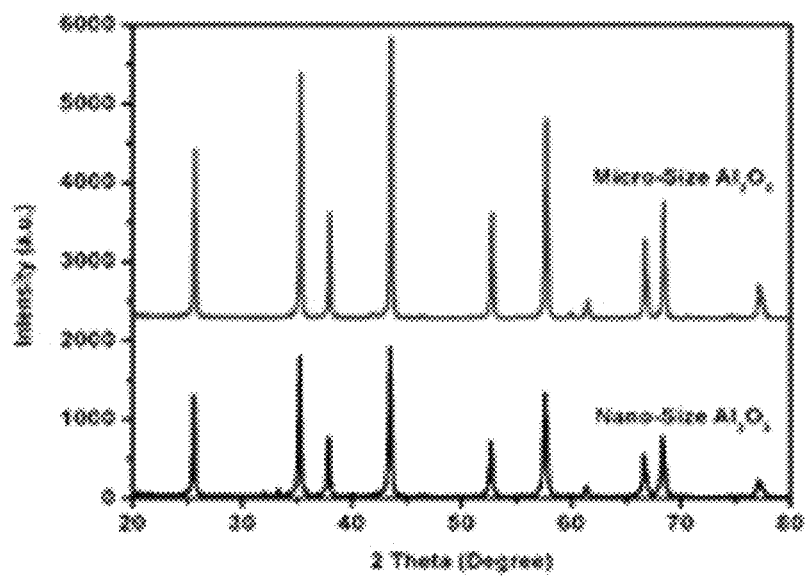
FIG. 1C shows an overlay of X-ray diffraction (XRD) patterns of alumina microparticles (micro-sized $Al_2O_3$) and alumina nanoparticles (nano-sized $Al_2O_3$).
Figure 1D:
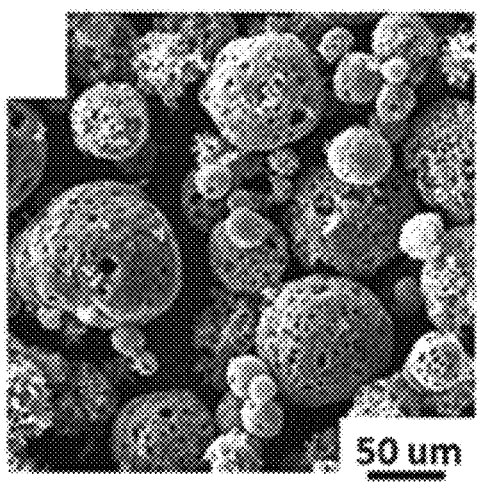
FIG. 1D is a FESEM micrograph (scale bar: 50 μm) of untreated oil fly ash particles.
Figure 1E:
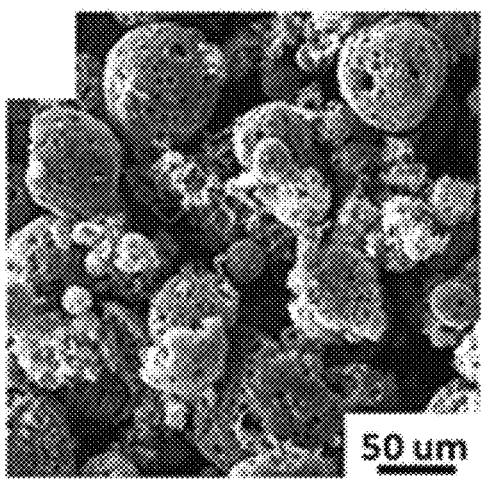
FIG. 1E is a FESEM micrograph (scale bar: 50 μm) of acid-treated oil fly ash particles.
Figure 1F:
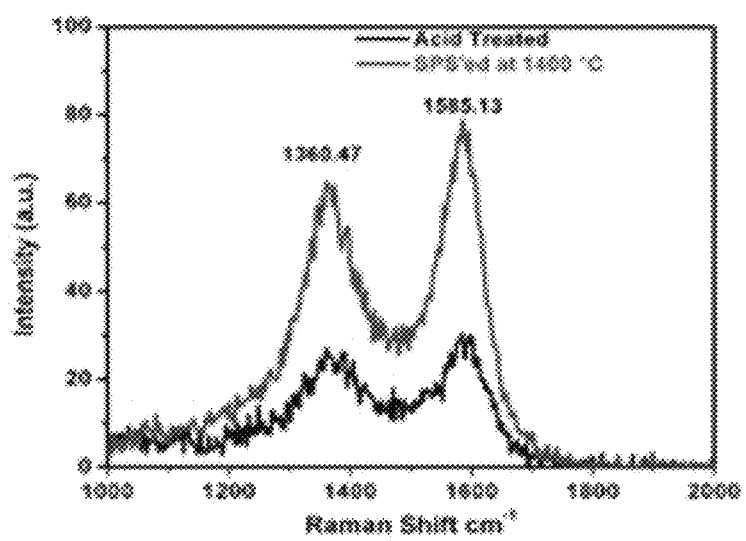
FIG. 1F shows an overlay of Raman spectra of acid-treated oil fly ash particles and spark plasma sintered oil fly ash particles.
Figure 2A:
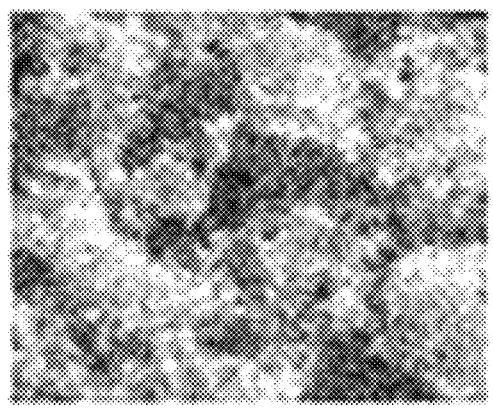
FIG. 2A shows an energy-dispersive X-ray spectroscopy (EDX) elemental mapping of carbon of untreated oil fly ash particles.
Figure 2B:
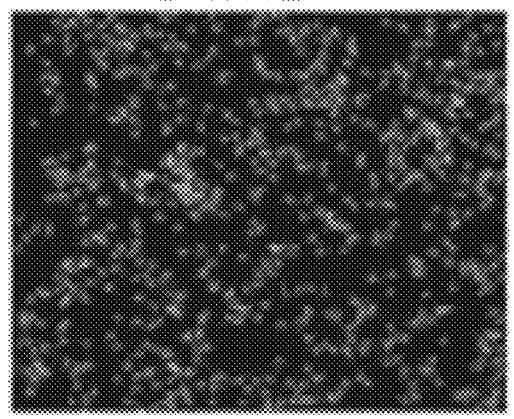
FIG. 2B shows an EDX elemental mapping of oxygen of untreated oil fly ash particles.
Figure 2C:
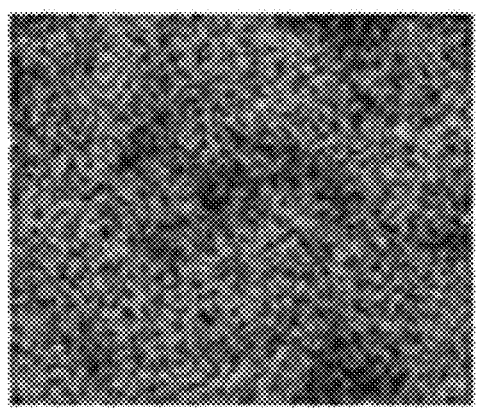
FIG. 2C shows an EDX elemental mapping of sulfur of untreated oil fly ash particles.
Figure 2D:
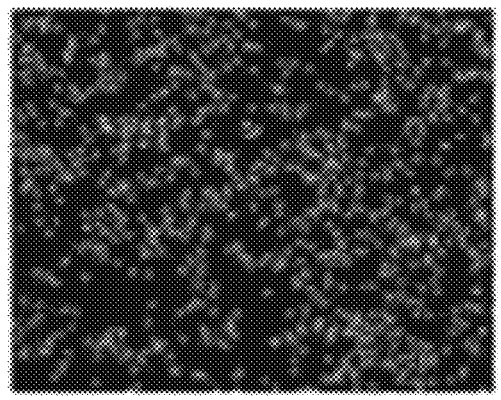
FIG. 2D shows an EDX elemental mapping of vanadium of untreated oil fly ash particles.
Figure 2E:
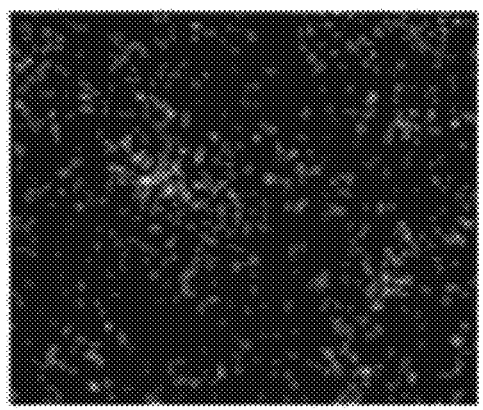
FIG. 2E shows an EDX elemental mapping of iron of untreated oil fly ash particles.
Figure 2F:
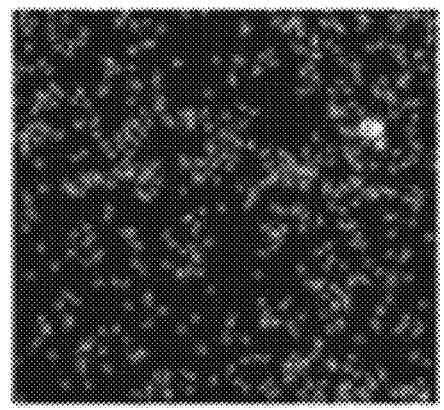
FIG. 2F shows an EDX elemental mapping of nickel of untreated oil fly ash particles.
Figure 2G:
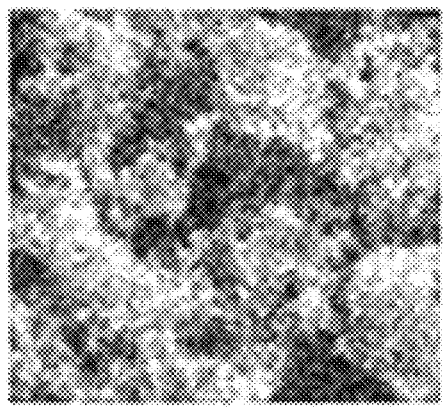
FIG. 2G shows an EDX elemental mapping of carbon of acid-treated oil fly ash particles.
Figure 2H:
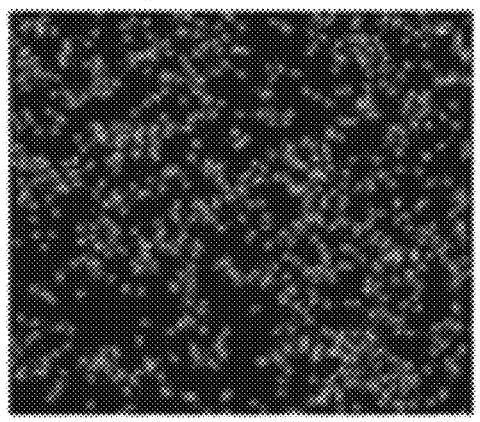
FIG. 2H shows an EDX elemental mapping of oxygen of acid-treated oil fly ash particles.
Figure 2I:
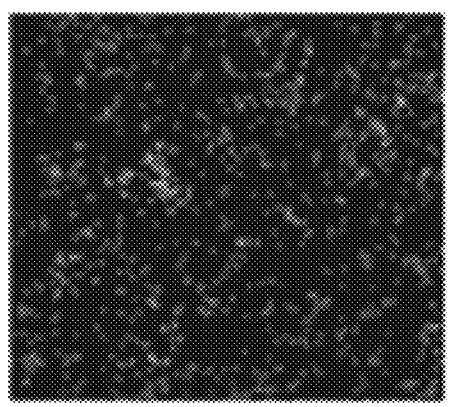
FIG. 2I shows an EDX elemental mapping of sulfur of acid-treated oil fly ash particles.

FIGS. 1A and B show the FESEM micrographs of as-received micro- and nano-sized $Al_2O_3$ powders. Micro- and nano-sized $Al_2O_3$ particles had an average size of ~15 μm and ~150 nm, respectively. XRD analysis performed for both micro- and nano-sized $Al_2O_3$ powders, as shown in FIG. 1C, confirmed the presence of $\alpha$-$Al_2O_3$. FIGS. 1D and E show the FESEM micrographs of as-received and acid treated OFA samples, respectively. Oil fly ash particles were porous and spherical in shape. The size of OFA particles were found to be in the range of 10-30 μm. Raman analysis of OFA samples which were acid treated or SPS'ed (1400° C.) are shown in FIG. 1F. The crystallinity nature of the OFA was observed by Raman peak belonging to the G-band and D-band and vibrations. In light of the Raman spectra shown in FIG. 1F, it was observed that the SPS'ed OFA sample at a temperature of 1400° C. had a much stronger G band peak in comparison to the as received and acid treated OFA sample. The greater the intensity of the G-band as compared to D-band, the better would be the crystallinity of the carbon structures. The D-band and G-band were observed at 1360 $cm^{-1}$ and 1585 $cm^{-1}$ respectively. The observed intensity ratio ($I_G/I_D$) for the SPS'ed sample (0.6362) as compared to acid treated OFA sample (0.3620) indicated that the graphitization of the OFA sample reached much higher when the sample was sintered at 1400° C.

Example 5

Microstructural and Phase Analysis: EDX of OFA

FIGS. 2A-F and FIGS. 2G-I each show the energy dispersive X-ray (EDX) mapping of as-received and acid treated OFA samples, respectively. Quantitatively, the EDX results for the two OFA samples are summarized in Table 2. The difference between the two OFA samples showed that acid treatment facilitated the removal of the elements such as Ni, V, Fe traces and oxidation the OFA.

TABLE 2

Elemental analysis of oil fly ash before treatment and after treatment

| Sr. # | Elements | Before acid treatment | | After acid treatment | |
|---|---|---|---|---|---|
| | | at. % | wt. % | at. % | wt. % |
| 1 | C | 88.52 | 78.99 | 78.76 | 66.57 |
| 2 | O | 6.84 | 8.02 | 15.53 | 20.21 |
| 3 | S | 3.66 | 8.74 | 5.71 | 13.22 |
| 4 | Ni | 0.31 | 1.36 | 0 | 0 |
| 5 | V | 0.41 | 1.82 | 0 | 0 |
| 6 | Fe | 0.26 | 1.07 | 0 | 0 |
| | Bal. | 100 | 100 | 100 | 100 |

Example 6

Microstructural and Phase Analysis: XRD of OFA Reinforced Alumina Composites

Figure 3A:
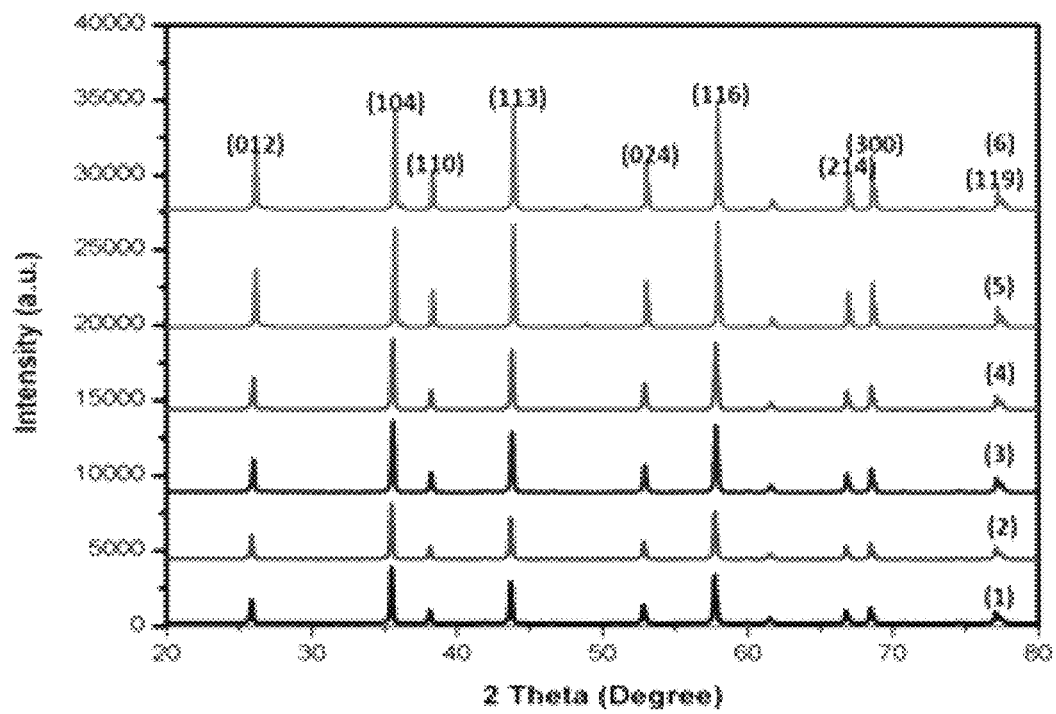
FIG. 3A shows an overlay of XRD patterns of spark plasma sintered alumina microparticles (sample 1), and composites containing alumina microparticles reinforced with different amounts of oil fly ash (samples 2-6) (refer to Table 1 for the sample ID).
Figure 3B:
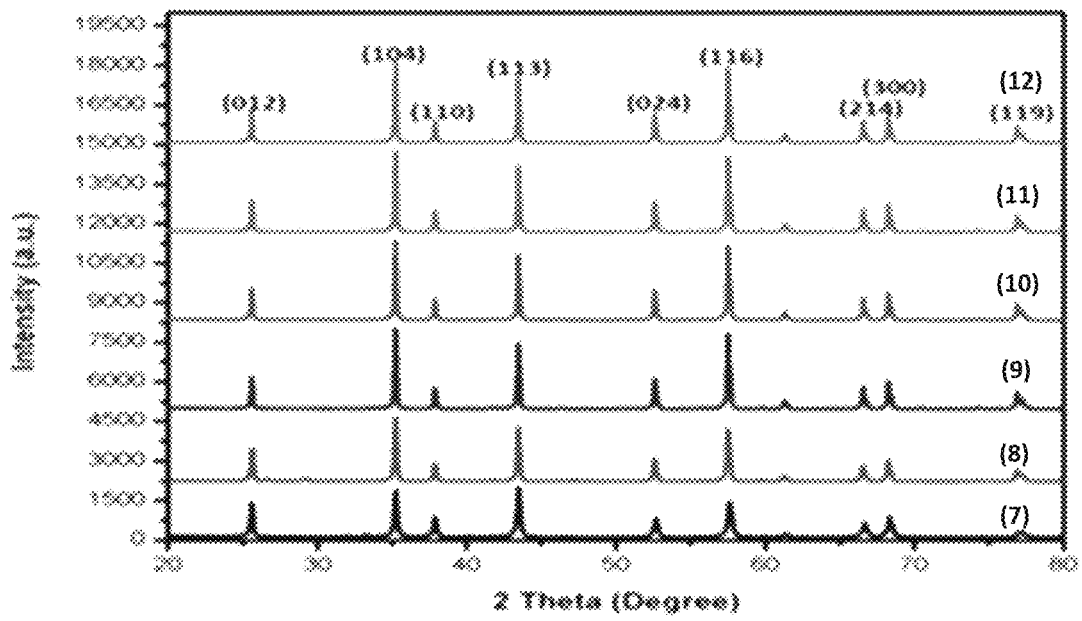
FIG. 3B shows an overlay of XRD patterns of spark plasma sintered alumina nanoparticles (sample 7), and composites containing alumina nanoparticles reinforced with different amounts of oil fly ash (samples 8-12) (refer to Table 1 for the sample ID).

FIGS. 3A-B show the XRD patterns of the sintered $Al_2O_3$-OFA composites. XRD analysis of sintered pure $Al_2O_3$ powder showed a high value of full width at half maximum (FWHM) of different planes, which was due to presence of submicron-sized particles. The crystallite size of alumina powder increased and the value of FWHM decreased after sintering. Additionally, there was no noticeable phase change observed in the alumina composites as shown in FIGS. 3A-B. Due to the weak diffraction of OFA, the strong alumina peaks had been masked [I. Ahmad, H. Cao, H. Chen, H. Zhao, A. Kennedy, Y. Q. Zhu, Carbon nanotube toughened aluminium oxide nanocomposite, J. Eur. Ceram. Soc. 30 (2010) 865-873].

Example 7

Microstructural and Phase Analysis: Raman of OFA Reinforced Alumina Composites

Figure 4A:
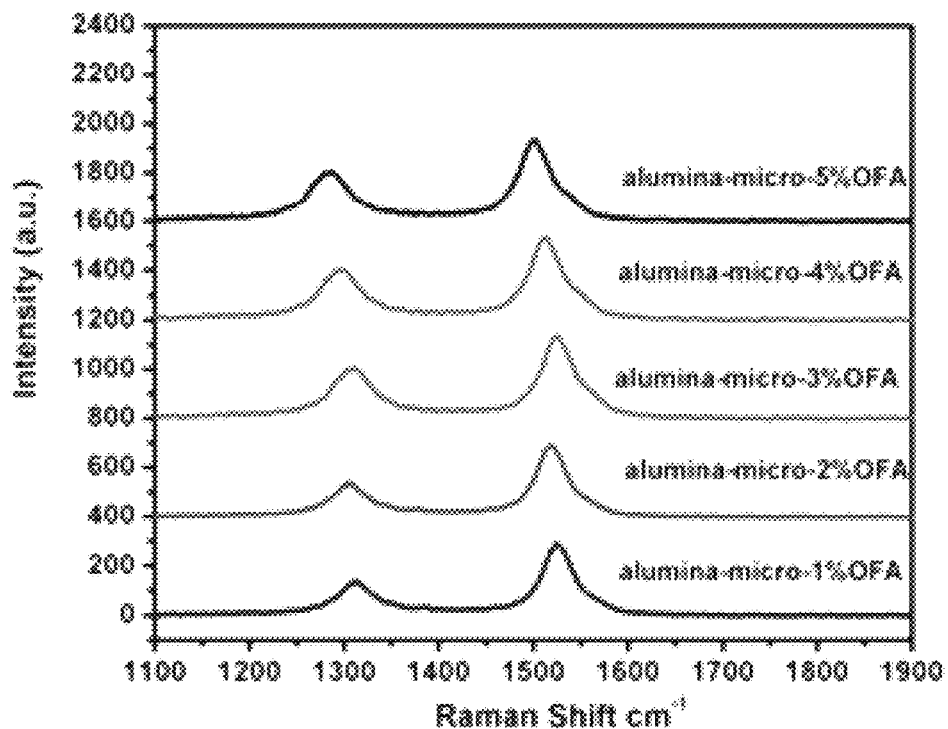
FIG. 4A shows an overlay of Raman spectra of composites containing alumina microparticles reinforced with different amounts of oil fly ash (samples 2-6).
Figure 4B:
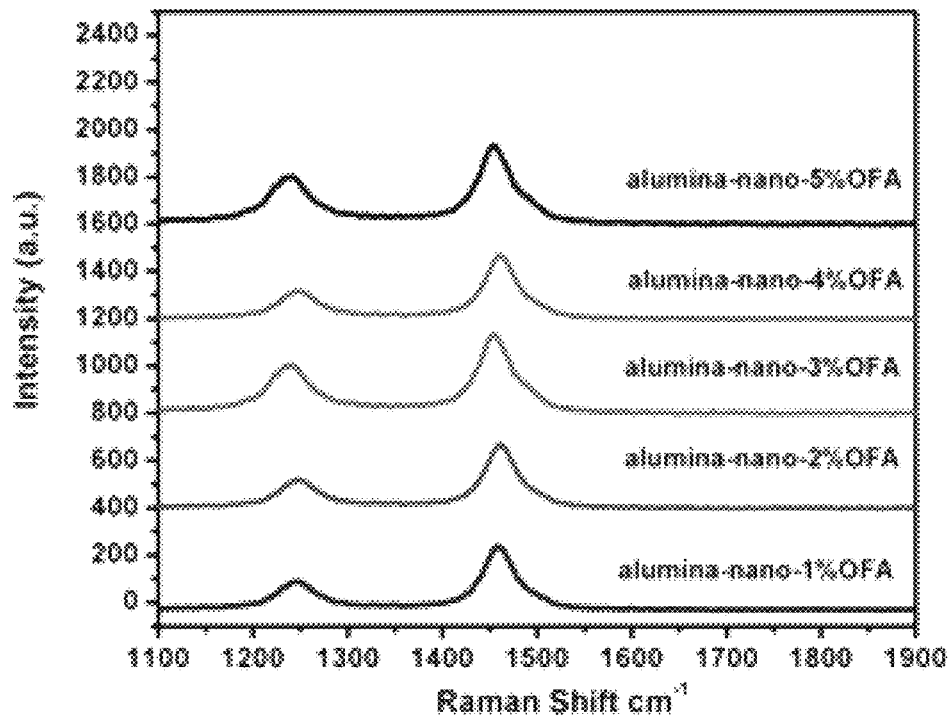
FIG. 4B shows an overlay of Raman spectra of composites containing alumina nanoparticles reinforced with different amounts of oil fly ash (samples 8-12).

In order to obtain data regarding the lattice vibration and to understand the structural information, i.e. the degree of graphitization and amorphization, Raman spectroscopy of OFA reinforced alumina was performed. Two strong Raman peaks representative of the D and G bands of carbon nanostructures were observed in the range of 1000-2000 $cm^{-1}$ [S. A. Ganiyu, K. Alhooshani, K. O. Sulaiman, M. Qamaruddin, I. A. Bakare, A. Tanimu, T. A. Saleh, Influence of aluminium impregnation on activated carbon for enhanced desulfurization of DBT at ambient temperature: Role of surface acidity and textural properties, Chem. Eng. J. 303 (2016) 489-500, incorporated herein by reference in its entirety]. The D-band (defect band) observed in graphite carbon is often associated with the impurities, symmetry defects and pores in the $sp^2$ configuration of carbon materials, whereas the G-band (graphite band) is representative of lattice vibrational motion ($E_{2g}$) in carbon atoms. Raman spectra of the OFA reinforced micro-sized and nano-sized alumina can be seen in FIGS. 4A-B. Raman spectroscopic analysis of OFA-alumina composite was performed after the sintering process. Two bands were detected at Raman shifts from 1325 $cm^{-1}$-1545 $cm^{-1}$ for micro-sized and from 1240 $cm^{-1}$-1460 $cm^{-1}$ for nano-sized alumina OFA, which correspond to the distinguishing values for D-band (defect-mode) and G-band (graphite mode), respectively. The Raman intensities of D and G band for micro-sized and nano-sized alumina-OFA were nearly equal. On the other hand, the value of $I_D/I_G$ ratio improved 2.76 times after the sintering process [A. Peigney, F. L. Garcia, C. Estournès, A. Weibel, C. Laurent, Toughening and hardening in double-walled carbon nanotube/nanostructured magnesia composites, Carbon N. Y. 48 (2010) 1952-1960; S. Sarkar, P. K. Das, Thermal and structural stability of single- and multi-walled carbon nanotubes up to 1800° C. in Argon studied by Raman spectroscopy and transmission electron microscopy, Mater. Res. Bull. 48 (2013) 41-47; and K. E. Thomson, D. Jiang, W. Yao, R. O. Ritchie, A. K. Mukherjee, Characterization and mechanical testing of alumina-based nanocomposites reinforced with niobium and/or carbon nanotubes fabricated by spark plasma sintering, Acta Mater. 60 (2012) 622-632, each incorporated herein by reference in their entirety], which indicated an orderly improvement in the structure and graphitization on the OFA [K. S. Novoselov, V. I. Fal'Ko, L. Colombo, P. R. Gellert, M. G. Schwab, K. Kim, A roadmap for graphene, Nature. 490 (2012) 192-200; N. Bakhsh, F. A. Khalid, A. S. Hakeem, Synthesis and characterization of pressureless sintered carbon nanotube reinforced alumina nanocomposites, Mater. Sci. Eng. A. 578 (2013) 422-429; T. S. Yeh, Y. S. Wu, Y. H. Lee, Graphitization of unburned carbon from oil-fired fly ash applied for anode materials of high power lithium ion batteries, Mater. Chem. Phys. 130 (2011) 309-315; and S. A. Ganiyu, K. Alhooshani, K. O. Sulaiman, M. Qamaruddin, I. A. Bakare, A. Tanimu, T. A. Saleh, Influence of aluminium impregnation on activated carbon for enhanced desulfurization of DBT at ambient temperature: Role of surface acidity and textural properties, Chem. Eng. J. 303 (2016) 489-500, each incorporated herein by reference in their entirety].

Example 8

Microstructural and Phase Analysis: FESEM and EDX of OFA Reinforced Alumina Composites FIGS. 5A-F show FESEM images and the morphologies of the micro- and nano-sized alumina-OFA composites, respectively. The micrographs of 1% OFA particles reinforced alumina showed uniform dispersion in both matrices. However, the number of pores found on the polished surfaces of the micro-sized $Al_2O_3$ samples was less than those for nano-sized matrix, which could be attributed to the variation in density of both alumina matrices.

Figure 5A:
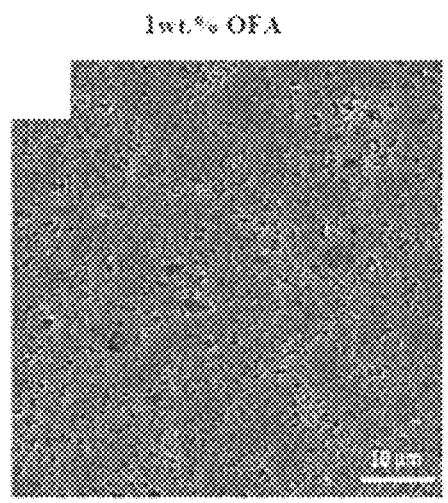
FIG. 5A is a FESEM micrograph (scale bar: 10 µm) of composite containing alumina microparticles reinforced with 1 wt % of oil fly ash (sample 2).
Figure 5B:
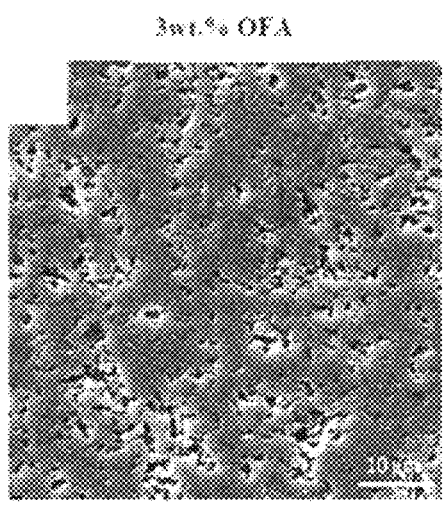
FIG. 5B is a FESEM micrograph (scale bar: 10 µm) of composite containing alumina microparticles reinforced with 3 wt % of oil fly ash (sample 4).
Figure 5C:
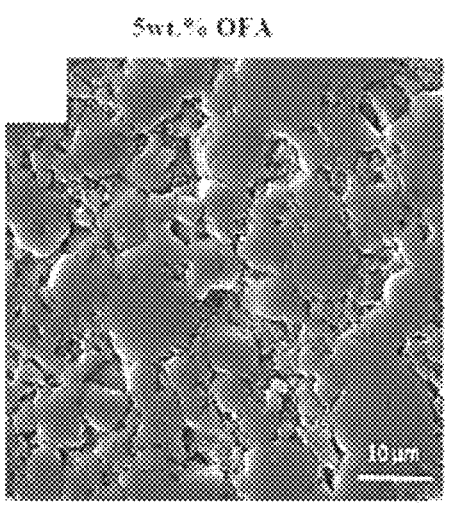
FIG. 5C is a FESEM micrograph (scale bar: 10 µm) of composite containing alumina microparticles reinforced with 5 wt % of oil fly ash (sample 6).

As shown in FIGS. 5A-B, there was a uniform distribution of the OFA particles within the alumina matrix along with very low agglomeration as not many clusters were observed in the samples. However, due to reinforcement settled along the grain boundaries of the matrix, agglomeration and porosity increased with an increasing OFA content in micro-sized composites [N. Saheb, N. U. Qadir, M. U. Siddiqui, A. F. M. Arif, S. S. Akhtar, N. Al-Aqeeli, Characterization of nanoreinforcement dispersion in inorganic nanocomposites: A review, Materials (Basel). 7 (2014) 4148-4181, incorporated herein by reference in its entirety].

Figure 5D:
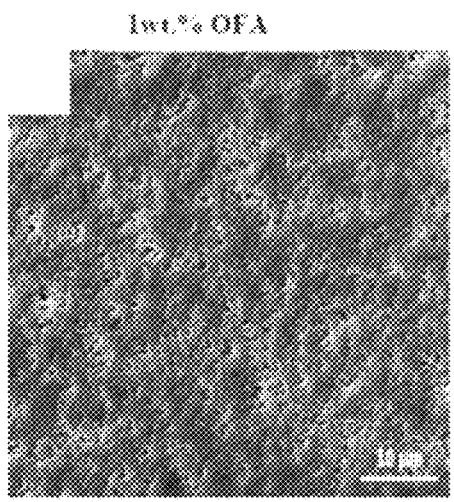
FIG. 5D is a FESEM micrograph (scale bar: 10 µm) of composite containing alumina nanoparticles reinforced with 1 wt % of oil fly ash (sample 8).
Figure 5E:
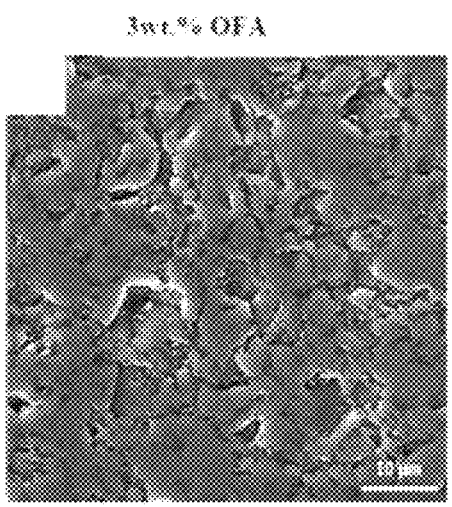
FIG. 5E is a FESEM micrograph (scale bar: 10 µm) of composite containing alumina nanoparticles reinforced with 3 wt % of oil fly ash (sample 10).
Figure 5F:
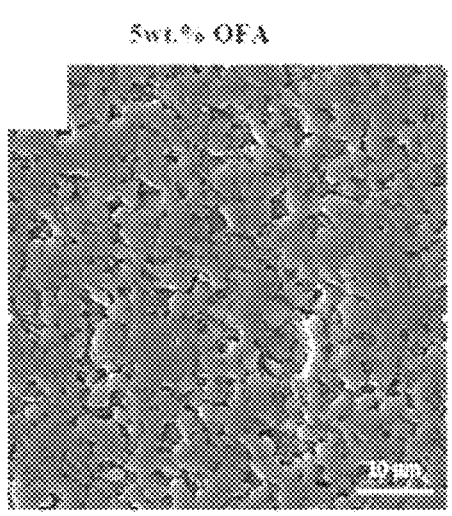
FIG. 5F is a FESEM micrograph (scale bar: 10 µm) of composite containing alumina nanoparticles reinforced with 5 wt % of oil fly ash (sample 12).

For the nano-alumina-OFA compositions shown in FIGS. 5D-F, because of the fine matrix size, the composites were found to be well consolidated, and OFA particles were uniformly dispersed within the matrix phase. This was more clearly demonstrated in the fractured surface of the samples both micro-sized and nano-sized alumina composites (FIGS. 7A-L).

Figure 6A:
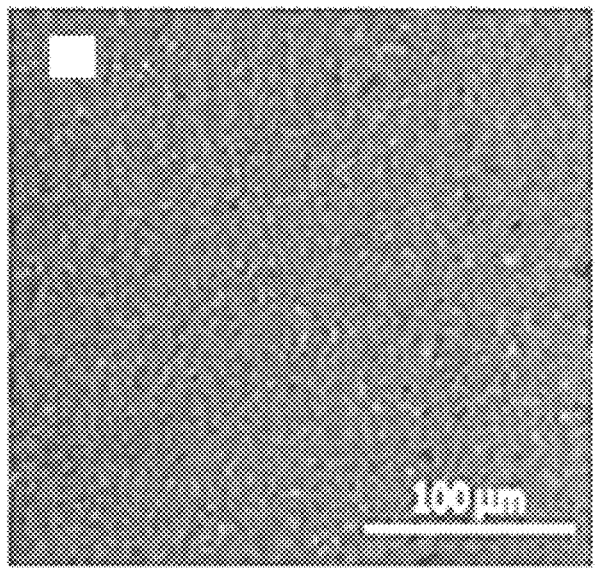
FIG. 6A is a FESEM micrograph (scale bar: 100 µm) of composite containing alumina nanoparticles reinforced with 1 wt % of oil fly ash (sample 8).
Figure 6B:
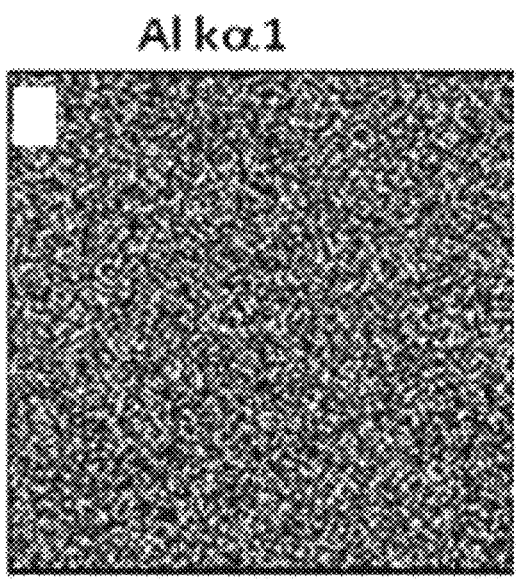
FIG. 6B shows an EDX elemental mapping of aluminum of the sample in FIG. 6A.
Figure 6C:
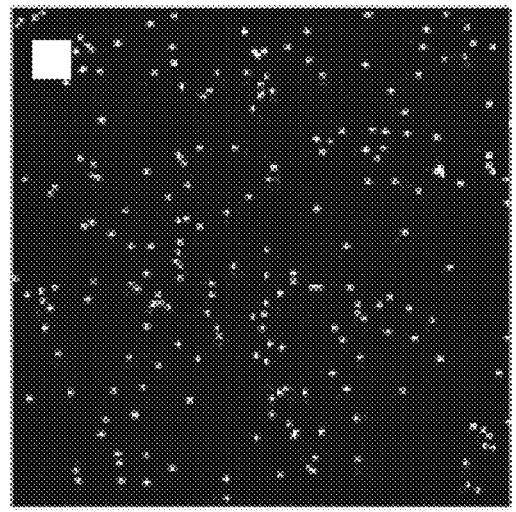
FIG. 6C shows an EDX elemental mapping of carbon of the sample in FIG. 6A.
Figure 6D:
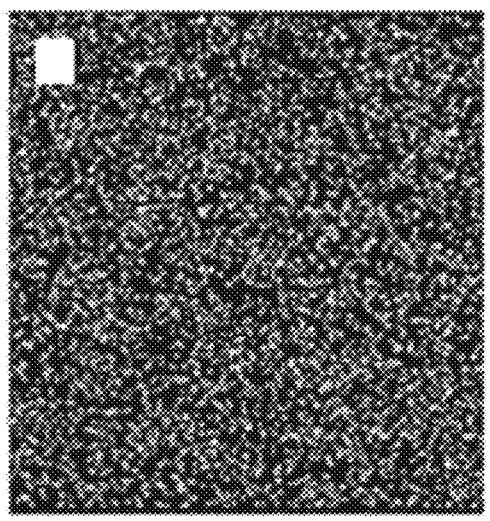
FIG. 6D shows an EDX elemental mapping of oxygen of the sample in FIG. 6A.

FIGS. 6B-D showing EDX-mapping of the samples also indicated the uniform distribution of the OFA particles in nano-sized alumina composites reinforced with 1 wt. % of OFA. Finer alumina particles could be trapped between the large particles and resulted in a higher densification.

Figure 7A:
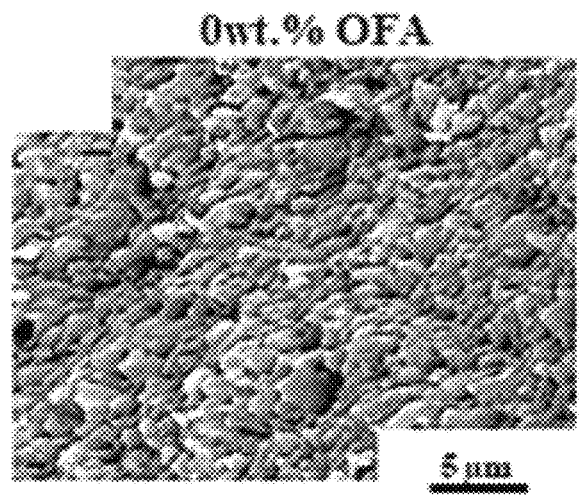
FIG. 7A is a FESEM micrograph (scale bar: 5 µm) showing a fractured surface of spark plasma sintered alumina microparticles (sample 1).
Figure 7B:
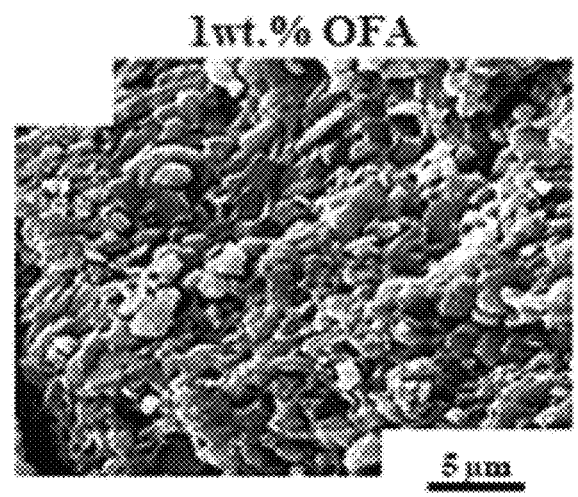
FIG. 7B is a FESEM micrograph (scale bar: 5 µm) showing a fractured surface of composite containing alumina microparticles reinforced with 1 wt % of oil fly ash (sample 2).
Figure 7C:
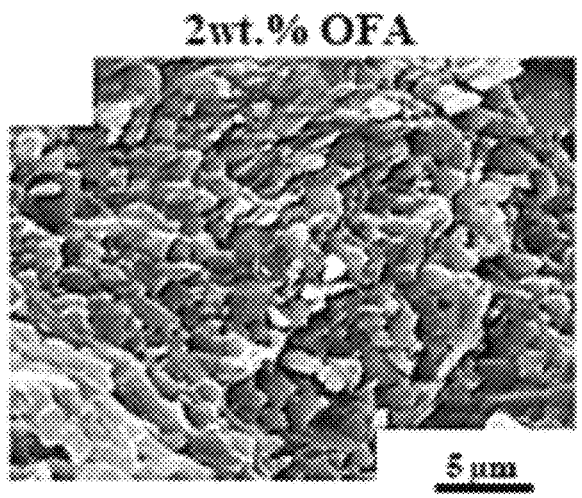
FIG. 7C is a FESEM micrograph (scale bar: 5 µm) showing a fractured surface of composite containing alumina microparticles reinforced with 2 wt % of oil fly ash (sample 3).
Figure 7D:
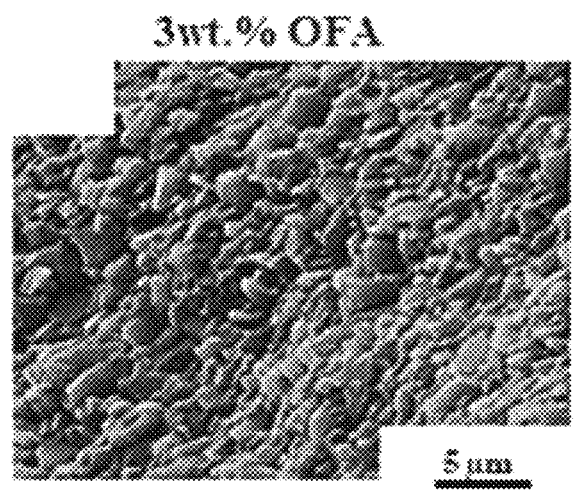
FIG. 7D is a FESEM micrograph (scale bar: 5 µm) showing a fractured surface of composite containing alumina microparticles reinforced with 3 wt % of oil fly ash (sample 4).
Figure 7E:
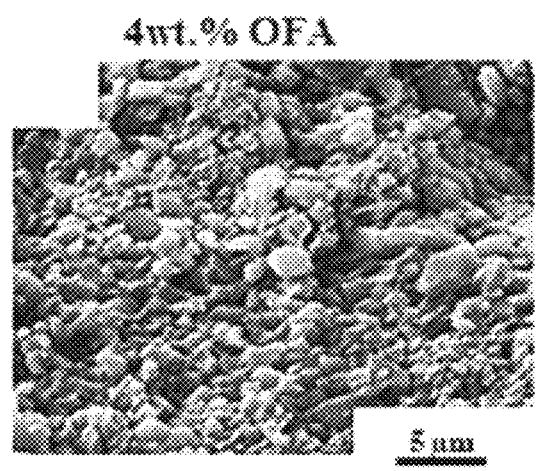
FIG. 7E is a FESEM micrograph (scale bar 5 µm) showing a fractured surface of composite containing alumina microparticles reinforced with 4 wt % of oil fly ash (sample 5).

As shown in FIGS. 7B and H, FESEM images of 1 wt. % $OFA-Al_2O_3$ composite showed the homogeneous dispersion of OFA. The included OFA was embedded within the alumina grains as shown in the fractured surfaces and OFA pulled out from the grains, which promoted the improvement in the fracture toughness of the composite.

Figure 7F:
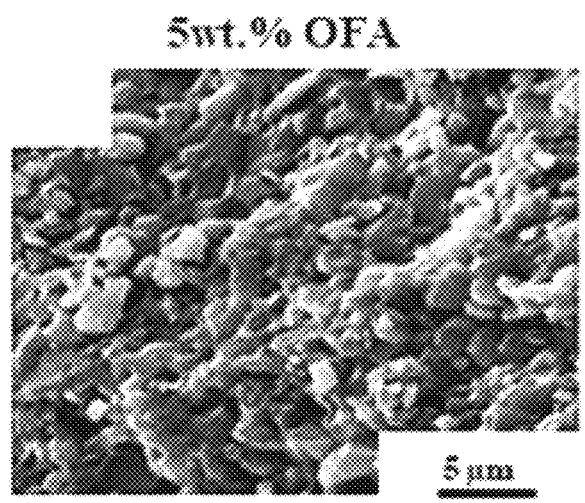
FIG. 7F is a FESEM micrograph (scale bar: 5 µm) showing a fractured surface of composite containing alumina microparticles reinforced with 5 wt % of oil fly ash (sample 6).
Figure 7G:
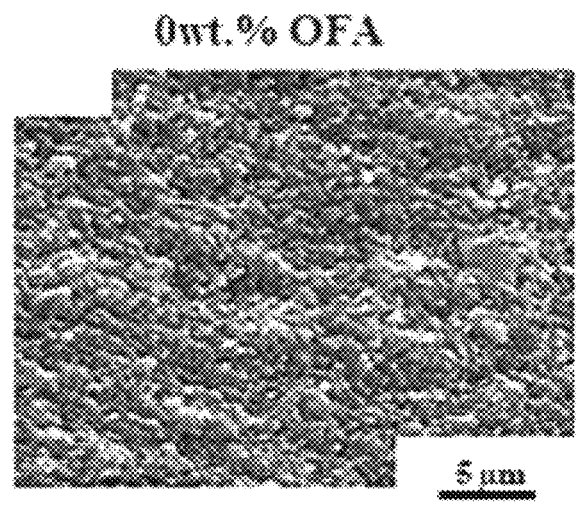
FIG. 7G is a FESEM micrograph (scale bar: 5 µm) showing a fractured surface of spark plasma sintered alumina nanoparticles (sample 7).
Figure 7H:
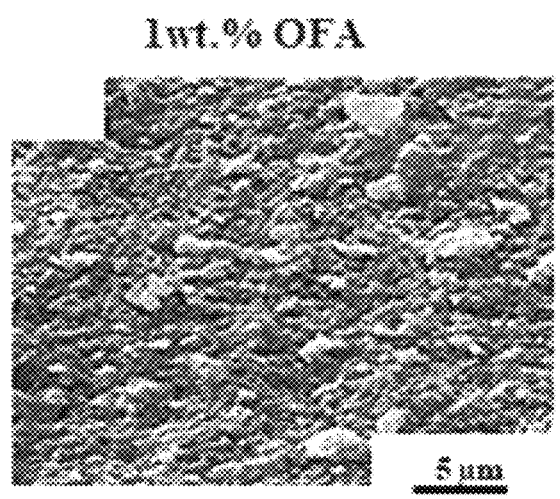
FIG. 7H is a FESEM micrograph (scale bar: 5 µm) showing a fractured surface of composite containing alumina nanoparticles reinforced with 1 wt % of oil fly ash (sample 8).
Figure 7I:
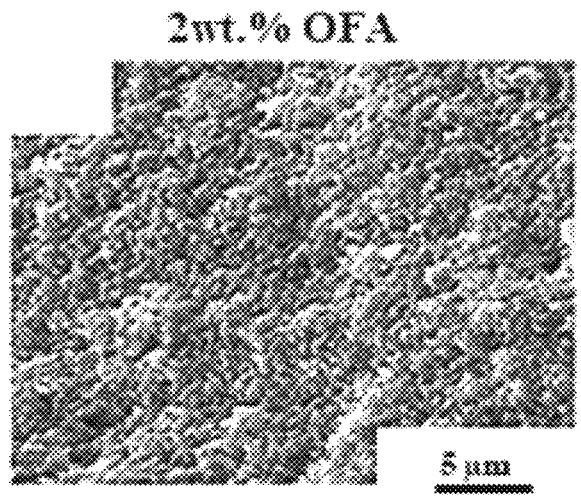
FIG. 7I is a FESEM micrograph (scale bar: 5 µm) showing a fractured surface of composite containing alumina nanoparticles reinforced with 2 wt % of oil fly ash (sample 9).
Figure 7J:
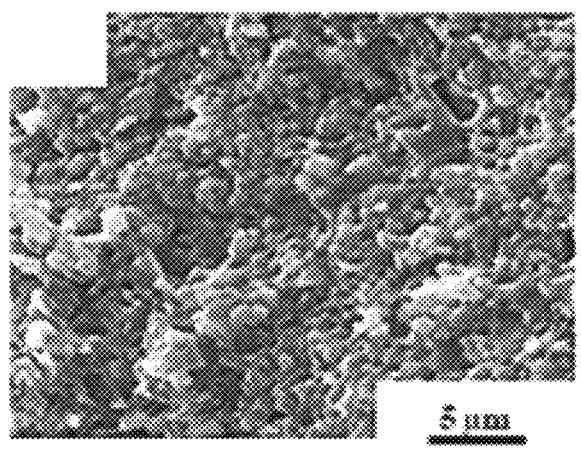
FIG. 7J is a FESEM micrograph (scale bar: 5 µm) showing a fractured surface of composite containing alumina nanoparticles reinforced with 3 wt % of oil fly ash (sample 10).
Figure 7K:
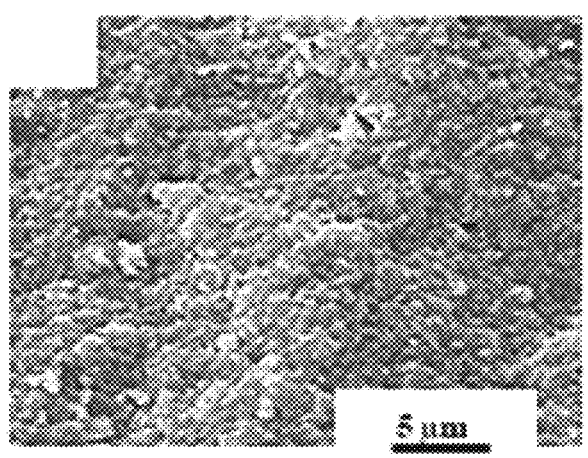
FIG. 7K is a FESEM micrograph (scale bar: 5 µm) showing a fractured surface of composite containing alumina nanoparticles reinforced with 4 wt % of oil fly ash (sample 11).
Figure 7L:
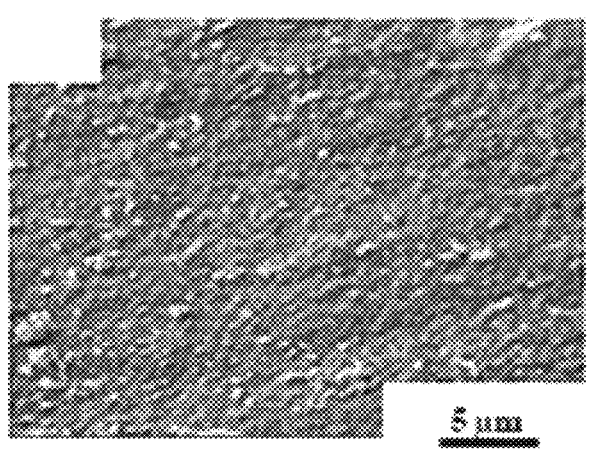
FIG. 7L is a FESEM micrograph (scale bar 5 µm) showing a fractured surface of composite containing alumina nanoparticles reinforced with 5 wt % of oil fly ash (sample 12).
Figure 8:
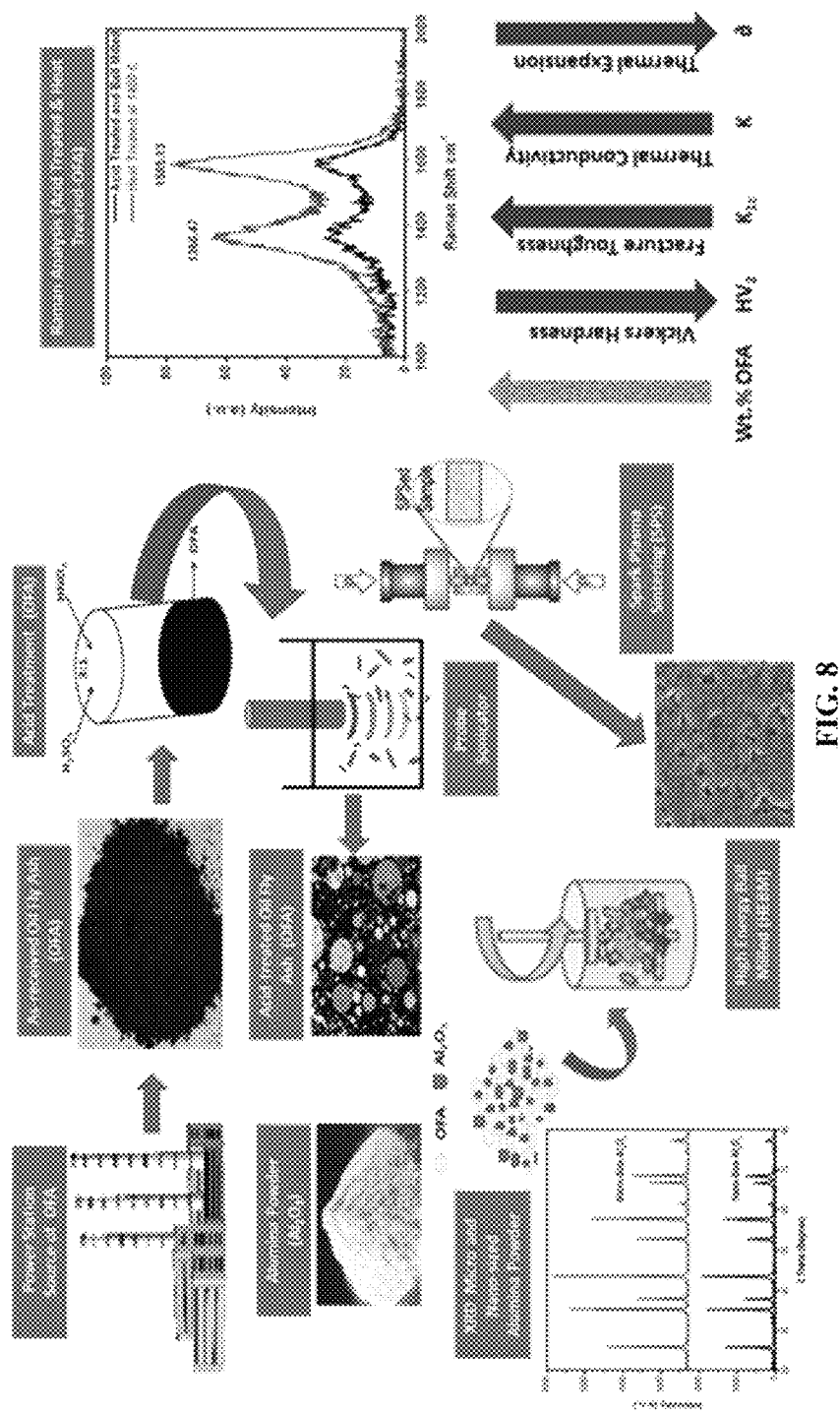
FIG. 8 is an illustrative scheme summarizing the production of composite.

The micrographs revealed intergranular and transgranular fracture morphologies. Moreover, the addition of 2-5 wt. % OFA in the alumina matrix led to formation of agglomerates as shown in FIGS. 7F and L, which had an adverse effect and deteriorated the mechanical properties.

Example 9

Densification, Thermal, and Mechanical Properties of the Composites

The thermal and mechanical properties of $Al_2O_3$-OFA composites, as a function of OFA content, for two different alumina matrix particle sizes (nano/micro) are summarized in Table 3.

TABLE 3

Thermo-mechanical properties of the samples sintered at 1400° C.

| | | Micro-sized Sample IDs | | | | | Nano-sized |
|---|---|---|---|---|---|---|---|
| | 1 Pure Micron | 2 1 wt. % OFA | 3 2 wt. % OFA | 4 3 wt. % OFA | 5 4 wt. % OFA | 6 5 wt. % OFA | 7 Pure Nano |
| Density (g/cm³) | 3.85(5) | 3.81(7) | 3.70(6) | 3.64(8) | 3.60(4) | 3.53(5) | 3.92(5) |
| Theoretical Density (g/cm³) | 3.95 | 3.92 | 3.88 | 3.85 | 3.82 | 3.79 | 3.95 |
| Relative Density (%) | 97.47 | 96.94 | 95.36 | 94.55 | 94.49 | 93.63 | 99.24 |
| Hardness $H_{v2}$ (GPa) | 19.3(5) | 17.6(6) | 15.4(8) | 13.7(6) | 13.2(8) | 11.9(3) | 23.2(4) |
| Fracture Toughness $K_{Ic}$ (MPa*m$^{1/2}$) | 3.84(7) | 3.89(8) | 3.97(5) | 4.17(9) | 4.15(6) | 4.13(4) | 4.11(6) |
| Thermal Expansion (ppm*K^-1) | 7.23 | 6.34 | 6.52 | 6.41 | 6.62 | 6.5 | 6.85 |
| Thermal Conductivity (W/m·K) 25° C. | 25.0(5) | 22.2(5) | 22.4(7) | 22.4(4) | 23.6(5) | 24.3(6) | 24.9(3) |
| 50° C. | 19.2(7) | 12.7(3) | 15.6(6) | 18.2(7) | 18.9(3) | 14.6(4) | 21.1(5) |
| 100° C. | 15.3(4) | 7.3(7) | 7.4(6) | 7.4(3) | 8.2(6) | 7.4(8) | 16.4(4) |

| | Nano-sized Sample IDs | | | | |
|---|---|---|---|---|---|
| | 8 1 wt. % OFA | 9 2 wt. % OFA | 10 3 wt. % OFA | 11 4 wt. % OFA | 12 5 wt. % OFA |
| Density (g/cm³) | 3.85(5) | 3.79(6) | 3.72(7) | 3.65(7) | 3.59(4) |
| Theoretical Density (g/cm³) | 3.92 | 3.88 | 3.85 | 3.82 | 3.79 |
| Relative Density (%) | 98.21 | 97.93 | 96.62 | 95.80 | 95.23 |
| Hardness $H_{v2}$ (GPa) | 20.6(7) | 18.3(8) | 17.5(6) | 14.6(4) | 15.2(3) |
| Fracture Toughness $K_{Ic}$ (MPa*m$^{1/2}$) | 4.26(5) | 4.38(7) | 4.52(8) | 4.71(3) | 4.85(6) |
| Thermal Expansion | 6.57 | 6.4 | 6.36 | 6.21 | 6.17 |

TABLE 3-continued

Thermo-mechanical properties of the samples sintered at 1400° C.

| (ppm*K^-1) Thermal Conductivity (W/m · K) | 25° C. | 25.8(6) | 25.8(4) | 26.4(3) | 27.3(5) | 27.9(4) |
|---|---|---|---|---|---|---|
| | 50° C. | 22.9(4) | 23.6(5) | 24.3(3) | 24.9(3) | 24.8(4) |
| | 100° C. | 17.5(5) | 18.1(5) | 19.1(6) | 19.8(3) | 19.3(5) |

Please refer to Table 1 for sample IDs.

As shown in Table 3, the density of alumina/OFA composites decreased with increasing OFA content. The microsize alumina displayed a higher porosity as compared to the nano-size alumina composites. The spark plasma sintering process formed a near full densification of around 99% for nano-size and 97% for micro-size $Al_2O_3$ [H. M. Irshad, B. A. Ahmed, M. A. Ehsan, T. I. Khan, T. Laoui, M. R. Yousaf, A. Ibrahim, A. S. Hakeem, Investigation of the structural and mechanical properties of micro-/nano-sized $Al_2O_3$ and cBN composites prepared by spark plasma sintering, Ceram. Int. 43 (2017) 10645-10653, incorporated herein by reference in its entirety]. The OFA showed impact on the final density of nano- and micro-size alumina composites. The density of the nano- and micro-sized composite with 1 wt. % OFA was 98.21% and 96.94%, respectively, in relation to the theoretical density of alumina. The addition of 2-5 wt. % OFA in $Al_2O_3$ resulted in lower density values of 97.93% to 95.23% for nano-size and 95.36% to 93.36% for micro-size, respectively.

Thermal conductivity was determined at three different temperatures at 25, 50, and 100° C. as a function of OFA content in both types of matrices (micro-/nano-). At room temperature (25° C.), thermal conductivity was seen to increases with increasing OFA content in nano-sized alumina. On the other hand, the micro-size matrix showed an unclear behavior in thermal conductivity with increasing OFA content. This fluctuation in the thermal conductivity occurred due to the increase of interfacial area and more voids generated within the matrix which resulted in variation in the density of micro-size composites. However, at higher temperatures (i.e. 50 and 100° C.), a similar trend was observed in the thermal conductivity with increasing OFA content. The maximum value of thermal conductivity was 27.9 W/m·K at room temperature in case of 5 wt. % OFA in a nano-sized alumina matrix. Thermal conductivity also depends on voids, interface resistance, particle size of fillers, and matrix. Conversely, the thermal expansion decreased as OFA was incorporated into either matrix, (Table 3). Such trend also increased with larger OFA amount, which could be attributed to the lower thermal expansion of OFA (1.2-1.5 ppm*k$^{-1}$).

As the amount of OFA increased from 1 to 5 wt. %, the hardness was observed to decrease from 19.3 to 11.9 GPa, and 23.2 to 14.6 GPa for micro- and nano-sized matrices, respectively. Therefore, the hardness of composites reduced due to the voids existing at grain boundaries. The fracture toughness of $Al_2O_3$/OFA composites increased as the amount of OFA fillers increased. The toughness enhancement was mainly attributed to the plastic deformation of the OFA fillers. If the particle is weakly bonded to the matrix, the crack will propagate along the interface. The toughness of the composite reached a maximum value of 4.85 MPa*m$^{1/2}$ as shown in Table 3.

The present results were compared with several reported sintering methods, for example, hot pressing, pressureless sintering, and spark plasma sintering. Vickers hardness and fracture toughness have been analyzed with different parameters (Table 4), such as varying carbon-based content, and different processing and testing methods. It has been reported that mechanical properties varied at different percentages of carbon-based materials (Table 4), which were impacted by the sintering process, mixing process, matrices (particle size), and type of carbon materials.

TABLE 4

Mechanical properties of alumina/carbon-based materials for various studies

| Material | Sintering Temperature (° C.) | $K_{Ic}$ (MPa · m$^{1/2}$) | $H_V$ (GPa) | Refs. |
|---|---|---|---|---|
| 1 vol. % CNT | 1600 | 3.92 ± 0.4 | 20 ± 0.4 | [a] |
| 3 vol. % CNT | 1550 | 4.68 | — | [b] |
| 5 vol. % CNT | 1500 | 3.6 | 12.6 | [c] |
| 1 wt. % MWCNT | 1450 | 3.7 ± 0.41 | — | [d] |
| 1.20 vol. % MWCNT | 1700 | 3.9 ± 0.01 | 18.21 ± 0.04 | [e] |
| 2 wt. % MWCNT | 1600 | 4.3 ± 0.3 | 18 ± 03 | [f] |
| 2.5 vol. % CNF | 1450 | 2.74 | 16.2 | [g] |
| 5 vol. % Graphene | 1350 | 2.4 ± 0.18 | 21.6 ± 0.295 | [h] |
| Composite made by SPS | | | | |
| 1.5 vol. % CNT | 1650 | 1.3 | 19.3 | [i] |
| 7.39 vol. % CNT | 1450 | 4.70 ± 0.74 | 9.98 ± 1.2 | [j] |
| 5.7 vol. % SWCNT | 1150 | 3.3 | 20.3 | [k] |
| 1 wt. % GO | 1300 | — | 18.6 ± 1.6 | [l] |
| 2 vol. % CNF | 1300 | 4.5 ± 0.6 | 20.4 ± 1.6 | [m] |
| 1.33 vol. % GPLs | 1550 | 3.94 ± 0.36 | 16.3 ± 0.44 | [n] |
| 5 wt. % (8.5 vol. %) OFA | 1400 | 4.85(6) | 15.2(3) | Present Work |

References:
[a] N. Bakhsh, F. A. Khalid, A. S. Hakeem, Synthesis and characterization of pressureless sintered carbon nanotube reinforced alumina nanocomposites, Mater. Sci. Eng. A. 578 (2013) 422-429;
[b] S. Wan, W. Sub, K. Sohn, C. Son, S. Lee, Improvement of flexure strength and fracture toughness in alumina matrix composites reinforced with carbon nanotubes, 517 (2009) 293-299;
[c] S. C. Zhang, W. G. Fahrenholtz, G. E. Hilmas, E. J. Yadlowsky, Pressureless sintering of carbon nanotube - $Al_2O_3$ composites, 30 (2010) 1373-1380;
[d] J. Sun, L. Gao, X. Jin, Reinforcement of alumina matrix with multi-walled carbon nanotubes, Ceram. Int. 31 (2005) 893-896;
[e] S. Sarkar, P. K. Das, Temperature and load dependent mechanical properties of pressureless sintered carbon nanotube/alumina nanocomposites, Mater. Sci. Eng. A. 531 (2012) 61-69;
[f] I. Ahmad, M. Unwin, H. Cao, H. Chen, H. Zhao, A. Kennedy, Y. Q. Zhu, Multi-walled carbon nanotubes reinforced Al 2 O 3 nanocomposites: Mechanical properties and interfacial investigations, Compos. Sci. Technol. 70 (2010) 1199-1206;
[g] S. Maensiri, P. Laokul, J. Klinkaewnarong, V. Amornkitbamrung, Carbon nanofiber-reinforced alumina nanocomposites: Fabrication and mechanical properties, Mater. Sci. Eng. A. 447 (2007) 44-50;
[h] H. Porwal, Q. Mary, S. Grasso, J. Khaliq, Graphene Reinforced Alumina Nano-Composites, (2013);
[i] C. B. Mo, S. I. Cha, K. T. Kim, K. H. Lee, S. H. Hong, Fabrication of carbon nanotube reinforced alumina matrix nanocomposite by sol-gel process, 395 (2005) 124-128;
[j] T. Zhang, L. Kumari, G. H. Du, W. Z. Li, Q. W. Wang, K. Balani, A. Agarwal, Composites: Part A Mechanical properties of carbon nanotube - alumina nanocomposites synthesized by chemical vapor deposition and spark plasma sintering, Compos. Part A. 40 (2009) 86-93;
[k] C.P. Development nanotube reinforced Alumina-Based ceramics nanotube reinfo reinforced oval mechanical, electrical, and thermal properties with n no mechanical, electrical, properties, 71 (2004) 161-171;
[l] F. Gutiérrez-Mora, R. Cano-Crespo, A. Rincón, R. Moreno, A. Domínguez-Rodríguez, Friction and wear behavior of alumina-based graphene and CNFs composites, J. Eur. Ceram. Soc. 37 (2017) 3805-3812;
[m] R. Cano-crespo, B. Malmal, D. Gómez-garcía, A. Domínguez-rodríguez, R. Moreno, Journal of the European Ceramic Society Carbon nanofibers replacing graphene oxide in ceramic composites as a reinforcing-phase: Is it feasible?, 37 (2017) 3791-3796; amd
[n] J. Liu, H. Yan, K. Jiang, Mechanical properties of graphene platelet-reinforced alumina ceramic composites, Ceram. Int. 39 (2013) 6215-6221, each incorporated herein by reference in their entirety.

Based on the results above, it was confirmed that the nano-sized $Al_2O_3$ matrix showed a higher degree of consolidation with and without OFA. However, as see in Tables 3 and 4, a most favourable thermal properties was observed for 4 and 5 wt. % OFA nano-sized matrix composite ($K_{IC}$: 4.7 and 4.85 MPa*m$^{1/2}$ and thermal conductivity: 27.3 and 27.9 W/m·K, respectively).

Example 10

An objective of this work is to investigate the effect of $Al_2O_3$ particle size and content of OFA reinforcement (wt. %), on the physical, microstructural, and thermo-mechanical behavior of $Al_2O_3$-OFA composites prepared using spark plasma sintering (SPS). Properties including densification, microstructure, thermal expansion, thermal conductivity, fracture toughness, and hardness of the prepared composite have been studied.

Specifically, SPS technique was used to prepare the nano/micro-sized alumina-OFA composites. And the thermo-mechanical properties of the nano/micro-composites were investigated. OFA was observed to be more uniformly dispersed in the nano-sized alumina matrix than in the micro-sized alumina matrix. Thermal conductivity was improved upon the addition of OFA, but it was reduced with increasing temperature, irrespective of the matrix particle size. Addition of OFA in the alumina matrix has decreased the relative density, hardness, and thermal expansion, but increased the toughness. The toughness and thermal conductivity were improved by changing the matrix particle size from microns to nanometres.

A nano-sized $Al_2O_3$ composite containing 1 wt. % OFA displayed a maximum hardness value of 20.6 GPa, and densification of 98.21% along with thermal conductivity of 25.8 (W/m·K) at room temperature. The composite displayed a desirable combination of hardness, fracture toughness, thermal expansion, and thermal conductivity properties which were essential for various refractory uses including automobile, aerospace, and abrasive applications.

The invention claimed is:

1. A method of producing a composite comprising oil fly ash dispersed in an alumina matrix, the method comprising:
   treating an oil fly ash with an acid mixture comprising sulfuric acid and nitric acid in a volumetric ratio of 2:1 to 5:1 to produce a treated oil fly ash;
   sonicating the treated oil fly ash and alumina in an organic solvent to form a slurry;
   heating the slurry to form a mixture; and
   sintering the mixture thereby producing the composite, wherein:
   a weight ratio of the alumina to the oil fly ash is in a range of 9:1 to 500:1;
   the sintering comprises applying a uniaxial pressure ranging from 30-80 MPa to the mixture; and
   the treated oil fly ash has a carbon content, a nickel content, an iron content, and a vanadium content which are lower compared to the oil fly ash, and a sulfur content and an oxygen content which are higher compared to the oil fly ash.

2. The method of claim 1, wherein the sintering is a spark plasma sintering process.

3. The method of claim 1, wherein the sintering is performed at a temperature ranging from 1,200-1,600° C.

4. The method of claim 3, wherein the sintering is performed with a holding time ranging from 5-60 minutes.

5. The method of claim 1, wherein the sintering comprises heating the mixture at a heating rate ranging from 50-150° C./min.

6. The method of claim 1, wherein the oil fly ash is devoid of nickel, iron, and vanadium.

7. The method of claim 1, wherein the oil fly ash is in the form of porous particles with an average particle size of 5-60 µm.

8. The method of claim 7, wherein the porous particles are spherical.

9. The method of claim 1, wherein the alumina comprises $\alpha$-$Al_2O_3$.

10. The method of claim 1, wherein the alumina is in the form of particles with an average particle size of 0.005-100 µm.

11. The method of claim 10, wherein the alumina is in the form of nanoparticles with an average particle size of 10-600 nm.

12. The method of claim 10, wherein the alumina is in the form of microparticles with an average particle size of 5-50 µm.

13. The method of claim 1, wherein a weight ratio of the alumina to the oil fly ash is in a range of 19:1 to 99:1.

14. The method of claim 1, wherein the composite has a density of 3.5-4.2 g/cm$^3$.

15. The method of claim 1, wherein the composite has a Vickers hardness of 11-23 GPa.

16. The method of claim 1, wherein the composite has a fracture toughness of 3.8-6 MPa×m$^{1/2}$.

17. The method of claim 1, wherein the composite has a coefficient of thermal expansion of 6-7 ppm×K$^{-1}$.

18. The method of claim 1, wherein the composite has a thermal conductivity of 7-30 W/m·K at a temperature ranging from 20-120° C.

19. The method of claim 1, wherein the organic solvent is an alcohol.

20. The method of claim 1, wherein:
   the oil fly ash has a carbon content of 70 to 90 wt %, an oxygen content of 4 to 16 wt %, a sulfur content of 6 to 14 wt %, a nickel content of 0.6 to 2.8 wt %, a vanadium content of 0.8 to 3.8 wt %, and an iron content of 0.5 to 2.1 wt %;
   the treated oil fly ash has a carbon content of 60 to 75 wt %, an oxygen content of 17 to 25 wt %, a sulfur content of 11 to 20 wt %, a nickel content of less than 0.1 wt %, a vanadium content of less than 0.1 wt %, and an iron content of less than 0.1 wt %;
   the treating is performed for 1 to 24 hours;
   the slurry is heated to 60 to 120° C. for 1 to 48 hours; and
   the mixture is substantially free of the organic solvent.

* * * * *